(12) United States Patent
Cerny et al.

(10) Patent No.: US 12,115,447 B2
(45) Date of Patent: Oct. 15, 2024

(54) BUFFER DRAIN RATE TUNING TO A MEASURED MAXIMUM RECEIVE BANDWIDTH MEASURED FOR A CLIENT DEVICE WHEN STREAMING

(71) Applicant: Sony Interactive Entertainment Inc., Tokyo (JP)

(72) Inventors: Mark E. Cerny, Los Angeles, CA (US); Kelvin M. Yong, Irvine, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 26 days.

(21) Appl. No.: 18/080,605

(22) Filed: Dec. 13, 2022

(65) Prior Publication Data

US 2023/0115947 A1     Apr. 13, 2023

Related U.S. Application Data

(63) Continuation of application No. 17/007,880, filed on Aug. 31, 2020, now Pat. No. 11,524,230.

(60) Provisional application No. 62/909,182, filed on Oct. 1, 2019, provisional application No. 62/909,185, filed on Oct. 1, 2019.

(51) Int. Cl.
| | | |
|---|---|---|
| *A63F 13/355* | (2014.01) | |
| *A63F 13/358* | (2014.01) | |
| *A63F 13/52* | (2014.01) | |
| *A63F 13/53* | (2014.01) | |
| *A63F 13/77* | (2014.01) | |
| *H04N 19/115* | (2014.01) | |
| *H04N 19/142* | (2014.01) | |
| *H04N 19/177* | (2014.01) | |

(52) U.S. Cl.
CPC .......... *A63F 13/355* (2014.09); *A63F 13/358* (2014.09); *A63F 13/52* (2014.09); *A63F 13/53* (2014.09); *A63F 13/77* (2014.09); *H04N 19/115* (2014.11); *H04N 19/142* (2014.11); *H04N 19/177* (2014.11); *A63F 2300/534* (2013.01); *A63F 2300/538* (2013.01)

(58) Field of Classification Search
CPC ...... A63F 13/355; A63F 13/358; A63F 13/52; A63F 13/53; A63F 13/77; A63F 2300/534; A63F 2300/538; H04N 19/115; H04N 19/142; H04N 19/177
See application file for complete search history.

(56) References Cited

PUBLICATIONS

JP Application No. 2022-520322 Office Action, Dated Oct. 31, 2023, 3 pages.

*Primary Examiner* — Reginald A Renwick
(74) *Attorney, Agent, or Firm* — PENILLA IP, APC

(57) ABSTRACT

A method for cloud gaming. The method including generating a plurality of video frames when executing a video game at a cloud gaming server. The method including encoding the plurality of video frames at an encoder bit rate, wherein the plurality of video frames that is compressed is transmitted to a client from a streamer of the cloud gaming server. The method including measuring a maximum receive bandwidth of a client. The method including monitoring the encoding of the plurality of video frames at the streamer. The method including dynamically tuning a parameter of the encoder based on the monitoring of the encoding.

20 Claims, 12 Drawing Sheets

BUFFER DRAIN RATE TUNING TO A MEASURED MAXIMUM RECEIVE BANDWIDTH MEASURED FOR A CLIENT DEVICE WHEN STREAMING

CLAIM OF PRIORITY

This application is a continuation of and claims priority to and the benefit of U.S. patent application Ser. No. 17/007,880, filed on Aug. 31, 2020, entitled "Encoder Tuning To Improve Tradeoffs Between Latency and Video Quality In Cloud Gaming Applications"; which claims priority to and the benefit of U.S. Provisional App. Ser. No. 62/909,182 filed on Oct. 1, 2019, entitled "Encoder Tuning To Improve Tradeoffs Between Latency and Video Quality In Cloud Gaming Applications," the disclosures of which are incorporated herein by reference in their entireties for all purposes. This application is a continuation of and claims priority to and the benefit of U.S. patent application Ser. No. 17/007,880, filed on Aug. 31, 2020, entitled "Encoder Tuning To Improve Tradeoffs Between Latency and Video Quality In Cloud Gaming Applications"; which claims priority to and the benefit of U.S. Provisional App. Ser. No. 62/909,185 filed on Oct. 1, 2019, entitled "Scene Change Hint And Client Bandwidth Used At Encoder For Handling Video Frames After A Scene Change In Cloud Gaming Applications," the disclosure of which is incorporated herein by reference in its entirety for all purposes.

TECHNICAL FIELD

The present disclosure is related to streaming systems configured for streaming content across a network, and more specifically for high performance encoders and decoders for cloud gaming systems, and for encoder tuning with an awareness of network transmission speeds and reliability, and overall latency targets.

BACKGROUND OF THE DISCLOSURE

In recent years there has been a continual push for online services that allow for online or cloud gaming in a streaming format between a cloud gaming server and a client connected through a network. The streaming format has increasingly become more popular because of the availability of game titles on demand, the ability to network between players for multi-player gaming, sharing of assets between players, sharing of instant experiences between players and/or spectators, allowing friends to watch a friend play a video game, having a friend join the on-going game play of a friend, and the like. Unfortunately, the demand is also pushing up against limits of the capabilities of network connections and the processing performed at the server and the client that is responsive enough to render high quality images as delivered to the client. For example, results of all gaming activities that are performed on the server need to be compressed and transmitted back to the client at low millisecond latency for the best user experience. Round-trip latency may be defined as the overall time between the user's controller input and the display of the video frames at the client; it may include processing and transmission of the control information from controller to client, processing and transmission of the control information from client to server, usage of that input at the server to generate a video frame responsive to the input, processing and transfer of the video frame to the encoding unit (e.g. scan-out), encode of the video frame, transmission of the encoded video frame back to the client, reception and decoding of the video frame, and any processing or staging of the video frame prior to its display. One-way latency may be defined as being the part of the round-trip latency consisting of the time from beginning of transfer of the video frame to the encoding unit (e.g. scan-out) at the server to the beginning of display of video frame at the client. A portion of the round-trip and one-way latency is associated with time taken for the data streams to be sent from client to server and server to client over a communications network. Another portion is associated with processing at client and server; improvements in these operations, such as advanced strategies related to frame decoding and display, can result in substantially reduced round-trip and one-way latency between the server and the client and provide a higher quality experience to users of cloud gaming services.

It is in this context that embodiments of the disclosure arise.

SUMMARY

Embodiments of the present disclosure relate to streaming systems configured for streaming content (e.g., gaming) across a network, and more specifically for providing encoder tuning to improve tradeoffs between one-way latency and video quality in cloud gaming systems, wherein encoder tuning may be based on monitoring of client bandwidth, skipped frames, number of encoded I-frames, number of scene changes, and/or number of video frames that exceed a target frame size, wherein tuned parameters may include encoder bit rate, target frame size, maximum frame size, and quantization parameter (QP) value, wherein high performance encoders and decoders help reduce the overall one-way latency between a cloud gaming server and client.

Embodiments of the present disclosure disclose a method for cloud gaming. The method including generating a plurality of video frames when executing a video game at a cloud gaming server. The method including encoding the plurality of video frames at an encoder bit rate, wherein the plurality of video frames that is compressed is transmitted to a client from a streamer of the cloud gaming server. The method including measuring a maximum receive bandwidth of a client. The method including monitoring the encoding of the plurality of video frames at the streamer. The method including dynamically tuning a parameter of the encoder based on the monitoring of the encoding.

In another embodiment, a non-transitory computer-readable medium storing a computer program for cloud gaming is disclosed. The computer-readable medium including program instructions for generating a plurality of video frames when executing a video game at a cloud gaming server. The computer-readable medium including program instructions for encoding the plurality of video frames at an encoder bit rate, wherein the plurality of video frames that is compressed is transmitted to a client from a streamer of the cloud gaming server. The computer-readable medium including program instructions for measuring a maximum receive bandwidth of a client. The computer-readable medium including program instructions for monitoring the encoding of the plurality of video frames at the streamer. The computer-readable medium including program instructions for dynamically tuning a parameter of the encoder based on the monitoring of the encoding.

In still another embodiment, a computer system includes a processor, and memory coupled to the processor and having stored therein instructions that, if executed by the computer system, cause the computer system to execute a method for cloud gaming. The method including generating a plurality of video frames when executing a video game at a cloud gaming server. The method including encoding the plurality of video frames at an encoder bit rate, wherein the plurality of video frames that is compressed is transmitted to a client from a streamer of the cloud gaming server. The method including measuring a maximum receive bandwidth of a client. The method including monitoring the encoding of the plurality of video frames at the streamer. The method including dynamically tuning a parameter of the encoder based on the monitoring of the encoding.

In still another embodiment, a method for cloud gaming is disclosed. The method including generating a plurality of video frames when executing a video game at a cloud gaming server. The method including predicting a scene change for a first video frame for the video game, wherein the scene change is predicted before the first video frame is generated. The method including generating a scene change hint that the first video frame is a scene change. The method including sending the scene change hint to the encoder. The method including delivering the first video frame to an encoder, wherein the first video frame is encoded as an I-frame based on the scene change hint. The method including measuring a maximum receive bandwidth of a client. The method including determining whether to encode or not encode a second video frame received at the encoder based on the maximum receive bandwidth of the client and a target resolution of a client display.

In another embodiment, a non-transitory computer-readable medium storing a computer program for cloud gaming is disclosed. The computer-readable medium including program instructions for generating a plurality of video frames when executing a video game at a cloud gaming server. The computer-readable medium including program instructions for predicting a scene change for a first video frame for the video game, wherein the scene change is predicted before the first video frame is generated. The computer-readable medium including program instructions for generating a scene change hint that the first video frame is a scene change. The computer-readable medium including program instructions for sending the scene change hint to the encoder. The computer-readable medium including program instructions for delivering the first video frame to an encoder, wherein the first video frame is encoded as an I-frame based on the scene change hint. The computer-readable medium including program instructions for measuring a maximum receive bandwidth of a client. The computer-readable medium including program instructions for determining whether to encode or not encode a second video frame received at the encoder based on the maximum receive bandwidth of the client and a target resolution of a client display.

In still another embodiment, a computer system includes a processor, and memory coupled to the processor and having stored therein instructions that, if executed by the computer system, cause the computer system to execute a method for cloud gaming. The method including generating a plurality of video frames when executing a video game at a cloud gaming server. The method including predicting a scene change for a first video frame for the video game, wherein the scene change is predicted before the first video frame is generated. The method including generating a scene change hint that the first video frame is a scene change. The method including sending the scene change hint to the encoder. The method including delivering the first video frame to an encoder, wherein the first video frame is encoded as an I-frame based on the scene change hint. The method including measuring a maximum receive bandwidth of a client. The method including determining whether to encode or not encode a second video frame received at the encoder based on the maximum receive bandwidth of the client and a target resolution of a client display.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
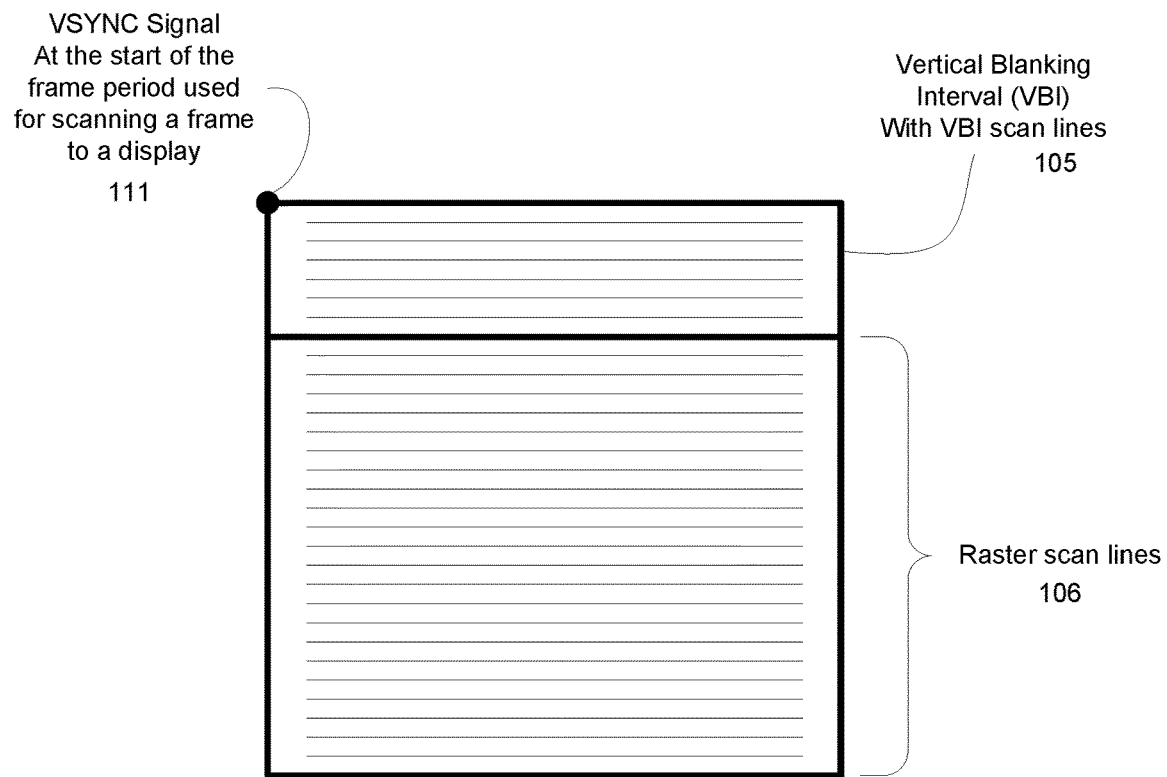
FIG. 1A is a diagram of a VSYNC signal at the beginning of a frame period, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe methods and systems configured to reduce latency and/or latency instability between source and target devices when streaming media content (e.g., streaming audio and video from video games). Latency instability may be introduced in the one-way latency between a server and client due to the additional time needed to generate a complex frame (e.g., scene change) at the server, increased times to encode/compress the complex frame at the server, variable communication paths over a network, and increased time to decode complex frames at the client. Latency instability may also be introduced due to differences in clocks at the server and the client, which causes a drift between server and client VSYNC signals. In embodiments of the present disclosure, one-way latency between the server and client can be reduced in cloud gaming applications by providing high performance encode and decode. When decompressing streaming media (e.g., streaming videos, movies, clips, content), it is possible to buffer a substantial amount of the decompressed video, and therefore it is possible to rely on average decode capabilities and metrics when displaying streamed content (e.g., rely on average amounts of decode resources to support 4K media at 60 Hz). However, with cloud gaming, increasing the time for performing encoding and/or decoding operations—even for a single frame—results in correspondingly higher one-way latency. Therefore, for cloud gaming it is beneficial to supply higher powered decoding and encoding resources that would appear to be unnecessary when compared to the needs of streaming video applications, and the resources should be optimized for time to handle frames that require longer or longest processing. In other embodiments, of the present disclosure, encoder tuning may be performed to improve tradeoffs between latency and video quality in cloud gaming applications. Encoder tuning is performed within an awareness of network transmission speeds and reliability, and overall latency targets. In embodiments, methods are performed to determine whether to delay encode and transmission of subsequent frames or to skip them when encoding runs long or data generated is large (e.g., both conditions may occur with an I-frame that is compressed). In embodiments, tuning of quantization parameter (QP) values, target frame size, and maximum frame size is performed based on available network speeds to the client. For example, QP may be lowered if network speeds are higher. In other embodiments, the monitoring of I-frame incidence is performed, and used in setting QP. For example, QP can be lowered (e.g., giving higher encoding precision or higher quality of encoding) if I-frames are infrequent, such that encoding of video frames may be skipped in order to keep one-way latency low, while sacrificing video playback quality. As such, high performance encode and decode, and encoder tuning performed to improve tradeoffs between latency and video quality in cloud gaming applications leads to a reduction in one-way latency, smoother frame rates, and more reliable and/or consistent one-way latency between the cloud gaming server and the client.

With the above general understanding of the various embodiments, example details of the embodiments will now be described with reference to the various drawings.

Throughout the specification, the reference to "game" or video game" or "gaming application" is meant to represent any type of interactive application that is directed through execution of input commands. For illustration purposes only, an interactive application includes applications for gaming, word processing, video processing, video game processing, etc. Further, the terms introduced above are interchangeable.

Cloud gaming includes the execution of a video game at the server to generate game rendered video frames, which are then sent to a client for display. Timing of operations at both the server and the client may be tied to respective vertical synchronization (VSYNC) parameters. When VSYNC signals are properly synchronized and/or offset between the server and/or the client, the operations performed at the server (e.g., generation and transmission of video frames over one or more frame periods) are synchronized with the operations performed at the client (e.g., displaying the video frames on a display at a display frame or refresh rate corresponding to the frame period). In particular, a server VSYNC signal generated at the server and a client VSYNC signal generated at the client may be used for synchronizing operations at the server and client. That is, when server and client VSYNC signals are synchronized and/or offset, the server generates and sends video frames in synchronization with how the client displays those video frames.

VSYNC signaling and vertical blanking intervals (VBI) have been incorporated for generating video frames and displaying those video frames when streaming media content between a server and a client. For example, the server strives to generate a game rendered video frame in one or several frame periods as defined by a corresponding server VSYNC signal (e.g. if a frame period of 16.7 ms, then generating a video frame each frame period results in 60 Hz operation, and generating one video frame for each two frame periods results in 30 Hz operation), and subsequently encode and transmit that video frame to the client. At the client, the received encoded video frames are decoded and displayed, wherein the client displays each video frame that is rendered for display beginning with a corresponding client VSYNC.

Figure 1B:
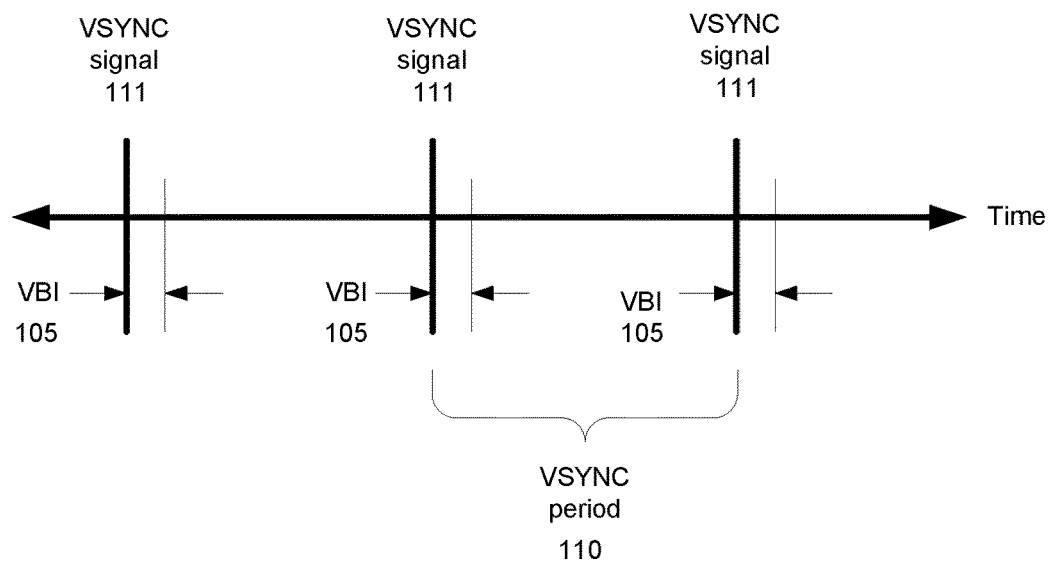
FIG. 1B is a diagram of the frequency of a VSYNC signal, in accordance with one embodiment of the present disclosure.

For illustration, FIG. 1A shows how a VSYNC signal 111 may indicate the beginning of a frame period, wherein various operations may be performed during a corresponding frame period at the server and/or client. When streaming media content, the server may use a server VSYNC signal for generating and encoding video frames, and the client may use a client VSYNC signal for displaying the video frames. The VSYNC signal 111 is generated at a defined frequency which corresponds to the defined frame period 110, as shown in FIG. 1B. In addition, VBI 105 defines the time period between when the last raster line was drawn on the display for a previous frame period and when the first raster line (e.g., top) is drawn to the display. As shown, after VBI 105, the video frame rendered for display is displayed via raster scanlines 106 (e.g., raster line by raster line, from left to right).

In addition, various embodiments of the present disclosure are disclosed for reducing one-way latency and/or latency instability between source and target devices, such as when streaming media content (e.g., video game content). For purposes of illustration only, the various embodiments for reducing one-way latency and/or latency instability are described within a server and client network configuration. However, it is understood that the various techniques disclosed for reducing one-way latency and/or latency instability may be implemented within other network configurations, and/or over peer-to-peer networks, as is shown in FIGS. 2A-2D. For example, the various embodiments disclosed for reducing one-way latency and/or latency instability may be implemented between one or more of server and client devices in various configurations (e.g., server and client, server and server, server and multiple clients, server and multiple servers, client and client, client and multiple clients, etc.).

Figure 2A:
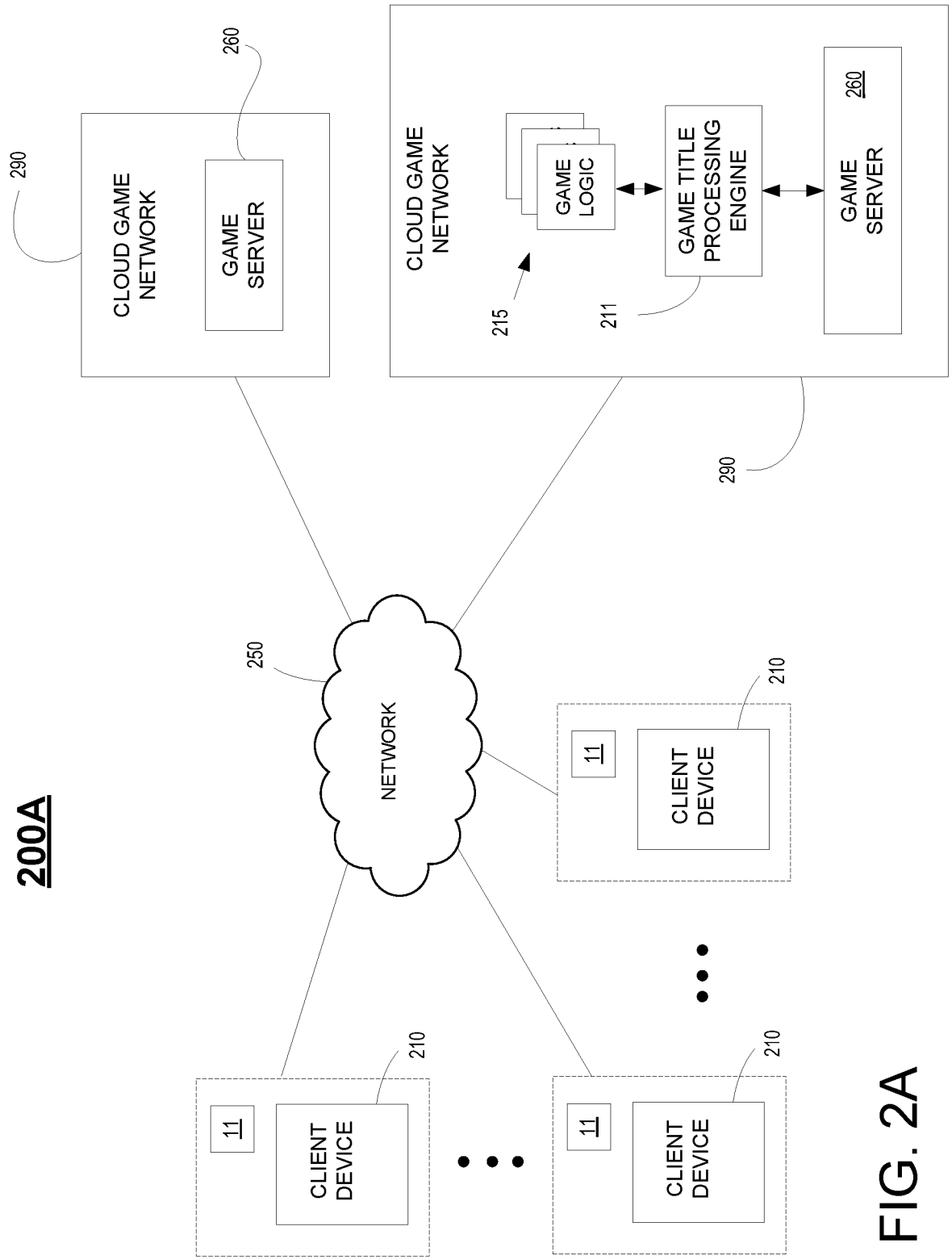
FIG. 2A is a diagram of a system for providing gaming over a network between one or more cloud gaming servers, and one or more client devices, in various configurations, wherein VSYNC signals can be synchronized and offset to reduce one-way latency, in accordance with one embodiment of the present disclosure.

FIG. 2A is a diagram of a system 200A for providing gaming over a network 250 between one or more cloud gaming networks 290 and/or servers 260, and one or more client devices 210, in various configurations, wherein server and client VSYNC signals can be synchronized and offset, and/or wherein dynamic buffering is performed on the client, and/or wherein encode and transmit operations on the server can be overlapped, and/or wherein receive and decode operations at the client can be overlapped, and/or wherein decode and display operations on the client can be overlapped to reduce one-way latency between the server 260 and client 210, in accordance with one embodiment of the present disclosure. In particular, system 200A provides gaming via a cloud game network 290, wherein the game is being executed remote from client device 210 (e.g., thin client) of a corresponding user that is playing the game, in accordance with one embodiment of the present disclosure. System 200A may provide gaming control to one or more users playing one or more games through the cloud game network 290 via network 250 in either single-player or multi-player modes. In some embodiments, the cloud game network 290 may include a plurality of virtual machines (VMs) running on a hypervisor of a host machine, with one or more virtual machines configured to execute a game processor module utilizing the hardware resources available to the hypervisor of the host. Network 250 may include one or more communication technologies. In some embodiments, network 250 may include $5^{th}$ Generation (5G) network technology having advanced wireless communication systems.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

As shown, the cloud game network 290 includes a game server 260 that provides access to a plurality of video games. Game server 260 may be any type of server computing device available in the cloud, and may be configured as one or more virtual machines executing on one or more hosts. For example, game server 260 may manage a virtual machine supporting a game processor that instantiates an instance of a game for a user. As such, a plurality of game processors of game server 260 associated with a plurality of virtual machines is configured to execute multiple instances of one or more games associated with gameplays of a plurality of users. In that manner, back end server support provides streaming of media (e.g., video, audio, etc.) of gameplays of a plurality of gaming applications to a plurality of corresponding users. That is, game server 260 is configured to stream data (e.g., rendered images and/or frames of a corresponding gameplay) back to a corresponding client device 210 through network 250. In that manner, a computationally complex gaming application may be executing at the back end server in response to controller inputs received and forwarded by client device 210. Each server is able to render images and/or frames that are then encoded (e.g., compressed) and streamed to the corresponding client device for display.

For example, a plurality of users may access cloud game network 290 via communications network 250 using corresponding client devices 210 configured for receiving streaming media. In one embodiment, client device 210 may be configured as a thin client providing interfacing with a back end server (e.g., game server 260 of cloud game network 290) configured for providing computational functionality (e.g., including game title processing engine 211). In another embodiment, client device 210 may be configured with a game title processing engine and game logic for at least some local processing of a video game, and may be further utilized for receiving streaming content as generated by the video game executing at a back end server, or for other content provided by back end server support. For local processing, the game title processing engine includes basic processor based functions for executing a video game and services associated with the video game. The game logic is stored on the local client device 210 and is used for executing the video game.

In particular, client device 210 of a corresponding user (not shown) is configured for requesting access to games over a communications network 250, such as the internet, and for rendering for display images generated by a video game executed by the game server 260, wherein encoded images are delivered to the client device 210 for display in association with the corresponding user. For example, the user may be interacting through client device 210 with an instance of a video game executing on game processor of game server 260. More particularly, an instance of the video game is executed by the game title processing engine 211. Corresponding game logic (e.g., executable code) 215 implementing the video game is stored and accessible through a data store (not shown), and is used to execute the video game. Game title processing engine 211 is able to support a plurality of video games using a plurality of game logics, each of which is selectable by the user.

For example, client device 210 is configured to interact with the game title processing engine 211 in association with the gameplay of a corresponding user, such as through input commands that are used to drive gameplay. In particular, client device 210 may receive input from various types of input devices, such as game controllers, tablet computers, keyboards, gestures captured by video cameras, mice, touch pads, etc. Client device 210 can be any type of computing device having at least a memory and a processor module that is capable of connecting to the game server 260 over network 250. The back-end game title processing engine 211 is configured for generating rendered images, which is delivered over network 250 for display at a corresponding display in association with client device 210. For example, through cloud based services the game rendered images may be delivered by an instance of a corresponding game executing on game executing engine 211 of game server 260. That is, client device 210 is configured for receiving encoded images (e.g., encoded from game rendered images generated through execution of a video game), and for displaying the images that are rendered for display 11. In one embodiment, display 11 includes an HMD (e.g., displaying VR content). In some embodiments, the rendered images may be streamed to a smartphone or tablet, wirelessly or wired, direct from the cloud based services or via the client device 210 (e.g., PlayStation® Remote Play).

In one embodiment, game server 260 and/or the game title processing engine 211 includes basic processor based functions for executing the game and services associated with the gaming application. For example, processor based functions include 2D or 3D rendering, physics, physics simulation, scripting, audio, animation, graphics processing, lighting, shading, rasterization, ray tracing, shadowing, culling, transformation, artificial intelligence, etc. In addition, services for the gaming application include memory management, multi-thread management, quality of service (QoS), bandwidth testing, social networking, management of social friends, communication with social networks of friends, communication channels, texting, instant messaging, chat support, etc.

In one embodiment, cloud game network 290 is a distributed game server system and/or architecture. In particular, a distributed game engine executing game logic is configured as a corresponding instance of a corresponding game. In general, the distributed game engine takes each of the functions of a game engine and distributes those functions for execution by a multitude of processing entities. Individual functions can be further distributed across one or more processing entities. The processing entities may be configured in different configurations, including physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the cloud game network 290, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g., video frames, audio, etc.) for the gaming application in response to controller input by a player. The distribution synchronization layer is able to efficiently execute (e.g., through load balancing) those functions across the distributed processing entities, such that critical game engine components/functions are distributed and reassembled for more efficient processing.

The game title processing engine 211 includes a central processing unit (CPU) and graphics processing unit (GPU) group that may be configured to perform multi-tenancy GPU functionality. In another embodiment, multiple GPU devices are combined to perform graphics processing for a single application that is executing on a corresponding CPU.

Figure 2B:
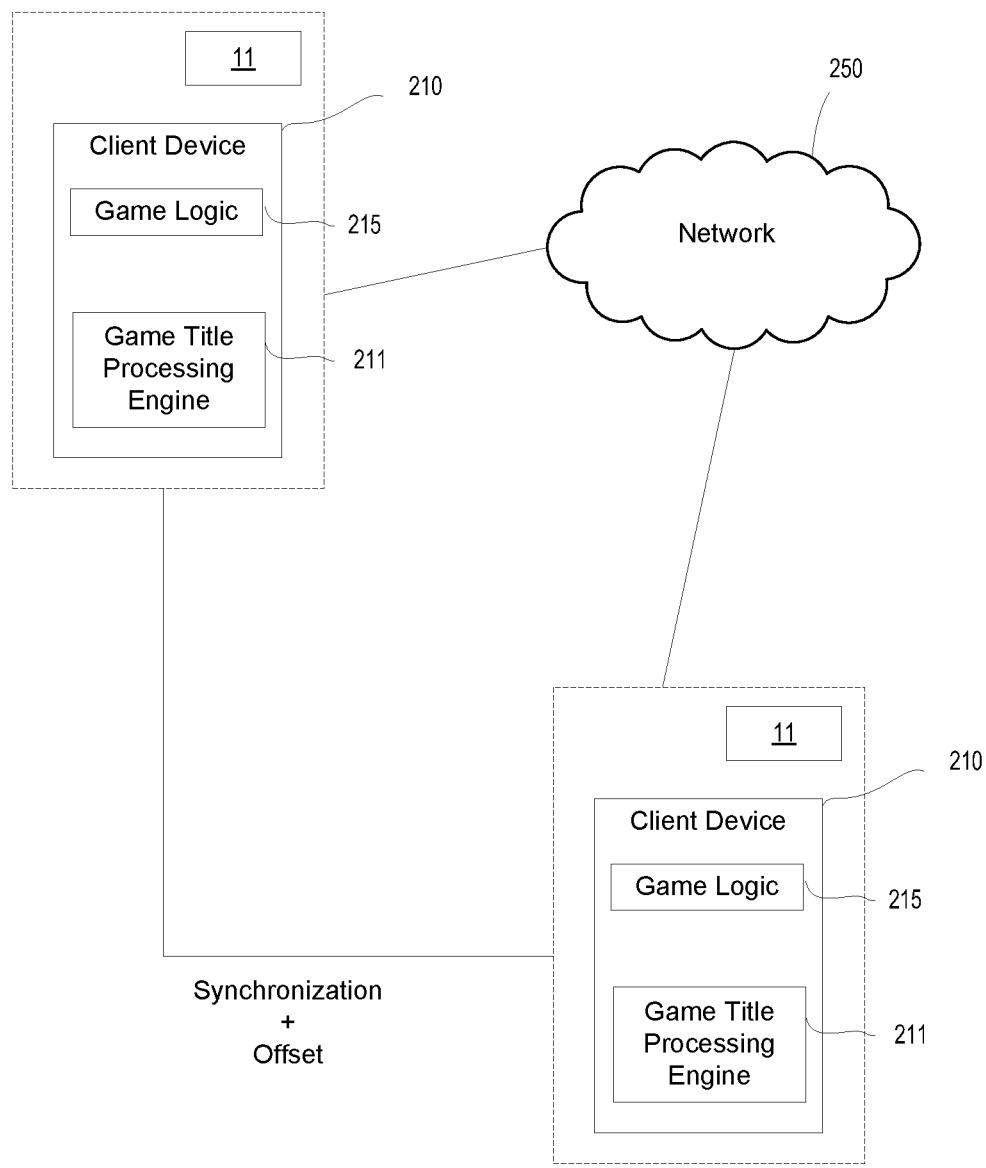
FIG. 2B is a diagram for providing gaming between two or more peer devices, wherein VSYNC signals can be synchronized and offset to achieve optimal timing of receipt of controller and other information between the devices, in accordance with one embodiment of the present disclosure.

FIG. 2B is a diagram for providing gaming between two or more peer devices, wherein VSYNC signals can be synchronized and offset to achieve optimal timing of receipt of controller and other information between the devices, in accordance with one embodiment of the present disclosure. For example, head-to-head gaming may be performed using two or more peer devices that are connected through network 250 or directly through peer-to-peer communication (e.g., Bluetooth, local area networking, etc.).

As shown, a game is being executed locally on each of the client devices 210 (e.g., game console) of corresponding users that are playing the video game, wherein the client devices 210 communicate through peer-to-peer networking. For example, an instance of a video game is executing by the game title processing engine 211 of a corresponding client device 210. Game logic 215 (e.g., executable code) implementing the video game is stored on the corresponding client device 210, and is used to execute the game. For purposes of illustration, game logic 215 may be delivered to the corresponding client device 210 through a portable medium (e.g. optical media) or through a network (e.g., downloaded through the internet from a gaming provider).

In one embodiment, the game title processing engine 211 of a corresponding client device 210 includes basic processor based functions for executing the game and services associated with the gaming application. For example, processor based functions include 2D or 3D rendering, physics, physics simulation, scripting, audio, animation, graphics processing, lighting, shading, rasterization, ray tracing, shadowing, culling, transformation, artificial intelligence, etc. In addition, services for the gaming application include memory management, multi-thread management, quality of service (QoS), bandwidth testing, social networking, management of social friends, communication with social networks of friends, communication channels, texting, instant messaging, chat support, etc.

Client device 210 may receive input from various types of input devices, such as game controllers, tablet computers, keyboards, gestures captured by video cameras, mice, touch pads, etc. Client device 210 can be any type of computing device having at least a memory and a processor module, and is configured for generating rendered images executed by the game title processing engine 211, and for displaying the rendered images on a display (e.g., display 11, or display 11 including a head mounted display—HMD, etc.). For example, the rendered images may be associated with an instance of the game executing locally on client device 210 to implement gameplay of a corresponding user, such as through input commands that are used to drive gameplay. Some examples of client device 210 include a personal computer (PC), a game console, a home theater device, a general purpose computer, mobile computing device, a tablet, a phone, or any other types of computing devices that can execute an instance of a game.

Figure 2C:
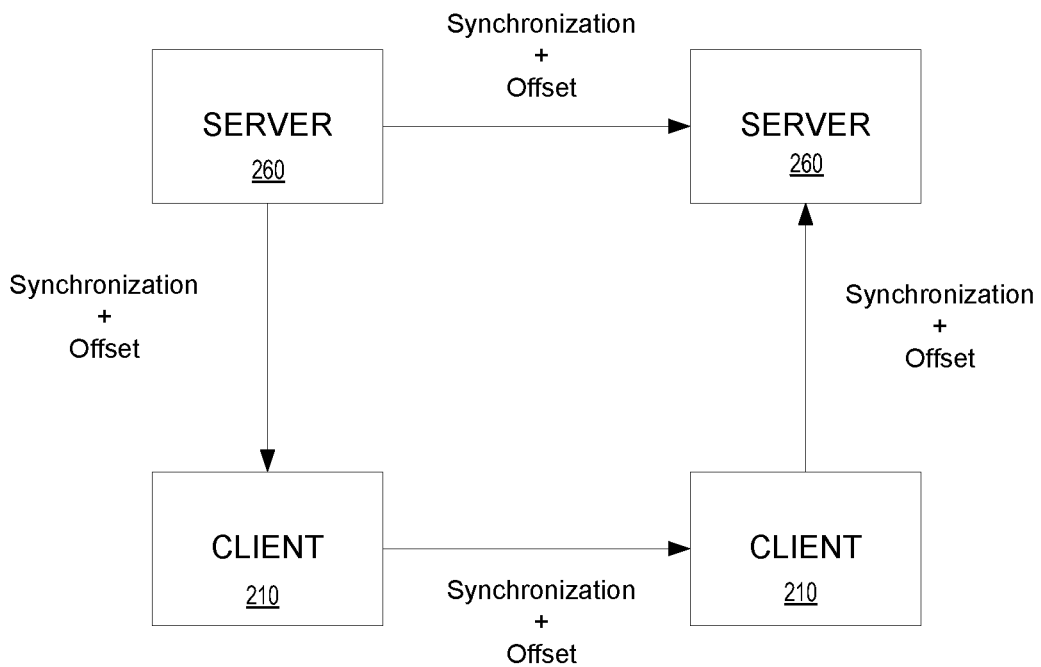
FIG. 2C illustrates various network configurations that benefit from proper synchronization and offsetting of VSYNC signals between a source device and a target device, in accordance with one embodiment of the present disclosure.

FIG. 2C illustrates various network configurations that benefit from proper synchronization and offsetting of VSYNC signals between a source device and a target device, including those configurations shown in FIGS. 2A-2B, in accordance with embodiments of the present disclosure. In particular, the various network configurations benefit from proper alignment of frequencies of server and client VSYNC signals, and a timing offset of the server and client VSYNC signals for purposes of reducing one-way latency and/or latency variability between a server and client. For example, one network device configuration includes a cloud gaming server (e.g., source) to client (target) configuration. In one embodiment, the client may include a WebRTC client configured for providing audio and video communication inside a web browser. Another network configuration includes a client (e.g. source) to server (target) configuration. Still another network configuration includes a server (e.g., source) to server (e.g., target) configuration. Another network device configuration includes a client (e.g., source) to client (target) configuration, wherein the clients can each be a gaming console to provide for head-to-head gaming, for example.

In particular, alignment of VSYNC signals may include synchronizing the frequencies of the server VSYNC signal and the client VSYNC signal, and may also include adjusting a timing offset between the client VSYNC signal and server VSYNC signal, for the purposes of removing drift, and/or to maintain an ideal relationship between server and client VSYNC signals, for purposes of reducing one-way latency and/or latency variability. To achieve proper alignment, the server VSYNC signal may be tuned in order to implement proper alignment between a server 260 and client 210 pair, in one embodiment. In another embodiment, the client VSYNC signal may be tuned in order to implement proper alignment between a server 260 and client 210 pair. Once the client and server VSYNC signals are aligned, the server VSYNC signal and client VSYNC signal occur at substantially the same frequency, and are offset from each other by a timing offset, that may be adjusted from time to time. In another embodiment, alignment of VSYNC signals may include synchronizing the frequencies of VSYNC for two clients, and may also include adjusting a timing offset between their VSYNC signals, for the purposes of removing drift, and/or achieving optimal timing of receipt of controller and other information; either VSYNC signal may be tuned to achieve this alignment. In still another embodiment, alignment may include synchronizing the frequencies of VSYNC for a plurality of servers, and may also include synchronizing the frequencies of the server VSYNC signals and the client VSYNC signals and adjusting a timing offset between the client VSYNC and server VSYNC signals, e.g. for head-to-head cloud gaming. In the server to client configuration and the client to client configuration, alignment may include both synchronization of the frequencies between the server VSYNC signal and client VSYNC signal, as well as providing a proper timing offset between the server VSYNC signal and client VSYNC signal. In the server to server configuration, alignment may include synchronization of the frequencies between the server VSYNC signal and client VSYNC signal without setting a timing offset.

Figure 2D:
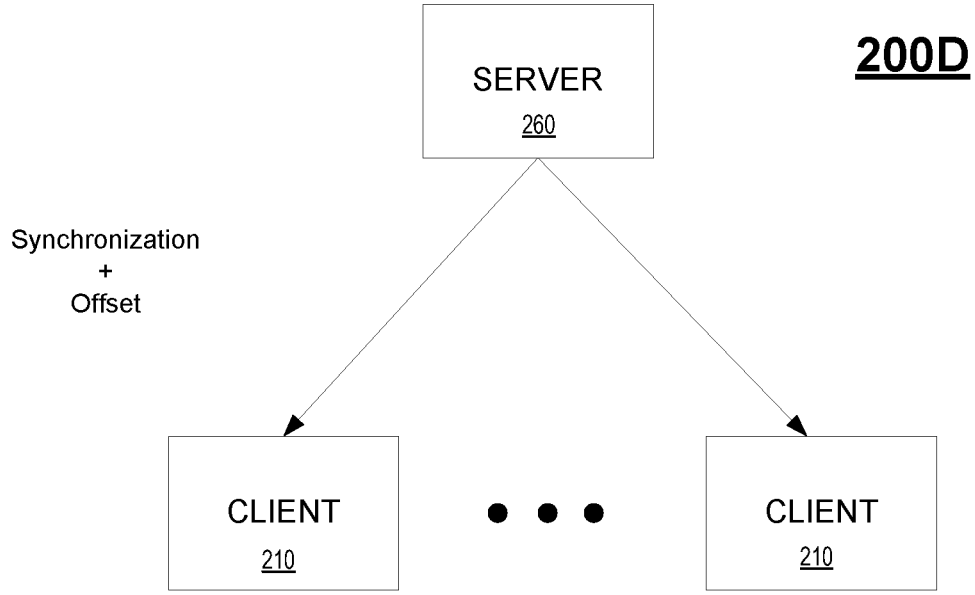
FIG. 2D illustrates a multi-tenancy configuration between a cloud gaming server and multiple clients that benefit from proper synchronization and offsetting of VSYNC signals between a source device and a target device, in accordance with one embodiment of the present disclosure.

FIG. 2D illustrates a multi-tenancy configuration between a cloud gaming server 260 and one or more clients 210 that benefit from proper synchronization and offsetting of VSYNC signals between a source device and a target device, in accordance with one embodiment of the present disclosure. In the server to client configuration, alignment may include both synchronization of the frequencies between the server VSYNC signal and client VSYNC signal, as well as providing a proper timing offset between the server VSYNC signal and client VSYNC signal. In the multi-tenancy configuration, the client VSYNC signal is tuned at each client 210 in order to implement proper alignment between a server 260 and client 210 pair, in one embodiment.

For example, a graphics subsystem may be configured to perform multi-tenancy GPU functionality, wherein one graphics subsystem could be implementing graphics and/or rendering pipelines for multiple games, in one embodiment. That is, the graphics subsystem is shared between multiple games that are being executed. In particular, a game title processing engine may include a CPU and GPU group that is configured to perform multi-tenancy GPU functionality, wherein one CPU and GPU group could be implementing graphics and/or rendering pipelines for multiple games, in one embodiment. That is, the CPU and GPU group is shared between multiple games that are being executed. The CPU and GPU group could be configured as one or more processing devices. In another embodiment, multiple GPU devices are combined to perform graphics processing for a single application that is executing on a corresponding CPU.

Figure 3:
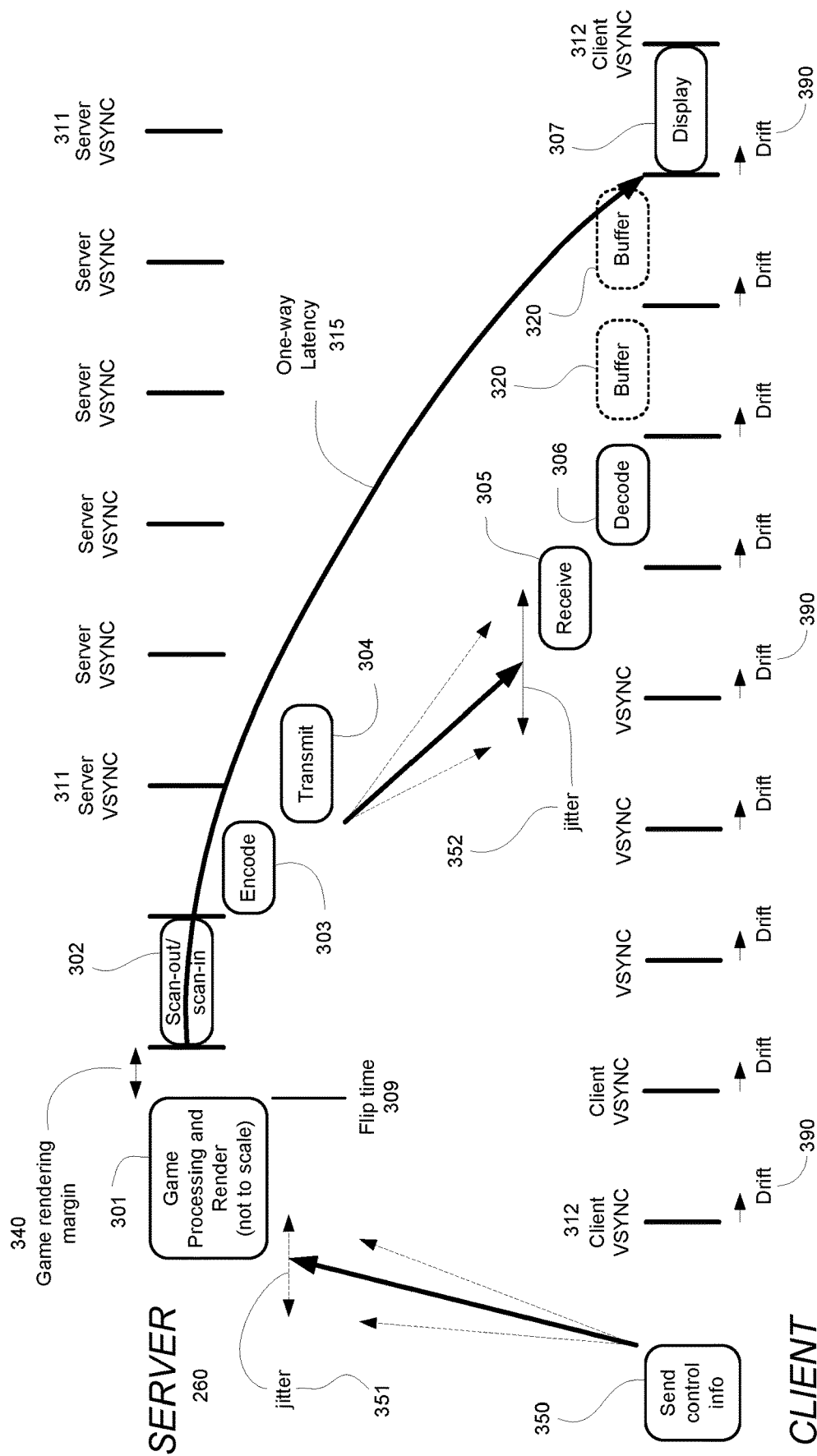
FIG. 3 illustrates the variation in one-way latency between a cloud gaming server and a client due to clock drift when streaming video frames generated from a video game executing on the server, in accordance with one embodiment of the present disclosure.

FIG. 3 illustrates the general process of executing a video game at a server to generate game rendered video frames and sending those video frames to a client for display. Traditionally, a number of the operations at the game server 260 and client 210 are performed within a frame period as defined by a respective VSYNC signal. For example, the server 260 strives to generate a game rendered video frame at 301 in one or multiple frame periods as defined by a corresponding server VSYNC signal 311. The video frame is generated by the game, either in response to control information (e.g., input commands of a user) delivered from an input device at operation 350, or game logic not driven by control information. Transmission jitter 351 may be present when sending control information to the server 260, wherein jitter 351 measures the variation of network latency from client to server (e.g., when sending input commands). As shown, the bold arrow shows the current delay when sending control information to the server 260, but due to jitter there may be a range of arrival times for control information at the server 260 (e.g. range bounded by the dotted arrows). At flip-time 309, the GPU reaches a flip command that indicates that the corresponding video frame has been completely generated and placed into the frame buffer at the server 260. Thereafter, the server 260 performs scan-out/scan-in (operation 302, wherein scan-out may be aligned with the VSYNC signal 311) for that video frame over the subsequent frame period as defined by the server VSYNC signal 311 (the VBI is omitted for clarity). Subsequently the video frame is encoded (operation 303) (e.g. encoding starts after an occurrence of the VSYNC signal 311, and the end of encoding may not be aligned with the VSYNC signal) and transmitted (operation 304, wherein transmission may not be aligned with the VSYNC signal 311) to the client 210. At the client 210, the encoded video frames are received (operation 305, wherein receive may not be aligned with the client VSYNC signal 312), decoded (operation 306, wherein decode may not be aligned with the client VSYNC signal 312), buffered, and displayed (operation 307, wherein the start of display may be aligned with the client VSYNC signal 312). In particular, the client 210 displays each video frame that is rendered for display beginning with a corresponding occurrence of the client VSYNC signal 312.

One-way latency 315 may be defined as being the latency from beginning of transfer of the video frame to the encoding unit (e.g. scan-out 302) at the server, to the beginning of display of the video frame at the client 307. That is, one-way latency is the time from server scan-out to client display, taking into account client buffering. Individual frames have a latency from beginning of scan-out 302 to completion of decode 306 that may vary from frame to frame due to the high degree of variance of server operations such as encode 303 and transmission 304, network transmission between the server 260 and client 210 with accompanying jitter 352, and client reception 305. As shown, the straight bold arrow shows the current latency when sending the corresponding video frame to the client 210, but due to jitter 352 there may be a range of arrival times for video frames at the client 210 (e.g. range bounded by the dotted arrows). As one-way latency must be relatively stable (e.g. kept fairly consistent) to achieve a good play experience, traditionally buffering 320 is performed with the result that the display of individual frames with low latency (e.g. from beginning of scan-out 302 to completion of decode 306) is delayed for several frame periods. That is, if there are network instabilities, or unpredictable encode/decode time, extra buffering is needed so that one-way latency is kept consistent.

One-way latency between a cloud gaming server and a client may vary due to clock drift when streaming video frames generated from a video game executing on the server, in accordance with one embodiment of the present disclosure. That is, differences in the frequencies of the server VSYNC signal 311 and the client VSYNC signal 312 may cause the client VSYNC signal to drift relative to the frames arriving from the server 260. The drift may be due to very slight differences in the crystal oscillators used in each of the respective clocks at the server and client. Furthermore, embodiments of the present disclosure reduce one-way latency by performing one or more of synchronization and offset of VSYNC signals for alignment between a server and a client, by providing dynamic buffering on the client, by overlapping encode and transmit of video frames at the server, by overlapping receive and decode of video frames at the client, and by overlapping decoding and displaying of video frames at the client.

In addition, during encoding (operation 303) of video frames, in previous technologies the encoder determines how much change there is between a current video frame being encoded, and one or more previously encoded frames to determine whether there is a scene change (e.g., complex image for the corresponding generated video frame). That is, a scene change hint may be inferred from the difference between the current frame to be encoded and previous frames that have already been encoded. When streaming content from a server to client over a network, the encoder at the server may decide to encode a video frame that is detected as a scene change with complexity. Otherwise, the encoder will encode a video frame that is not detected as s scene change with less complexity. However, detection of a scene change at the encoder may take up to one frame period (e.g., adding jitter), as the video frame is initially encoded with less complexity (in a first frame period), but then is re-encoded (in a second frame period) with more complexity once it is determined that there is a scene change. Also, the detection of a scene change may be triggered unnecessarily (such as through minor explosions in the image), as the difference between the currently encoded video frame and a previously encoded video frame may exceed a threshold difference value, even though there is no scene change. As such, when a scene change is detected at the encoder, additional latency due to jitter is introduced at the encoder to accommodate for performing scene change detection and re-encoding the video frame with more complexity.

Figure 4:
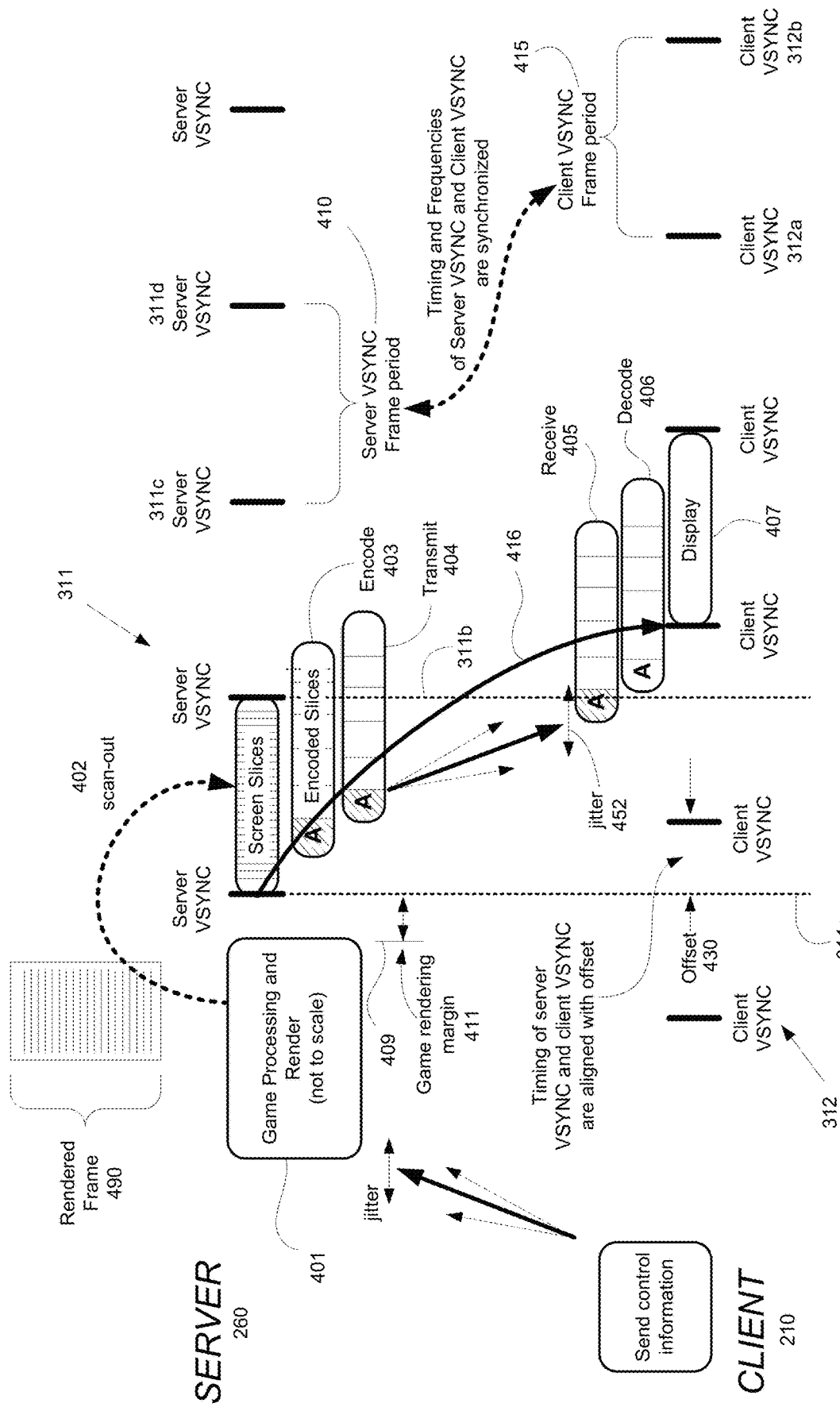
FIG. 4 illustrates a network configuration including a cloud gaming server and a client when streaming video frames generated from a video game executing on the server, the VSYNC signals between the server and the client being synchronized and offset to allow for overlapping of operations at the server and client, and to reduce one-way latency between the server and the client.

FIG. 4 illustrates the flow of data through a network configuration including a highly optimized cloud gaming server 260 and a highly optimized client 210 when streaming video frames generated from a video game executing on the server, wherein overlapping server operations and client operations reduces the one-way latency, and synchronizing and offsetting the VSYNC signals between the server and the client reduces the one-way latency as well as reduces variability in the one-way latency between the server and the client, in accordance with embodiments of the present disclosure. In particular, FIG. 4 shows the desired alignment between the server and the client VSYNC signals. In one embodiment, tuning of the server VSYNC signal 311 is performed to obtain proper alignment between server and client VSYNC signals, such as in a server and client network configuration. In another embodiment, tuning of the client VSYNC signal 312 is performed to obtain proper alignment between server and client VSYNC signals, such as in a multi-tenant server to multiple clients network configuration. For purposes of illustration, tuning of the server VSYNC signal 311 is described in FIG. 4 for purposes of synchronizing the frequencies of server and client VSYNC signals, and/or adjusting the timing offset between corresponding client and server VSYNC signals, though it is understood that the client VSYNC signal 312 may also be used for tuning. In the context of this patent, "synchronize" should be taken to mean tuning the signals so that their frequencies match, but phase may differ; "offset" should be taken to mean the time delay between the signals, e.g. the time between when one signal reaches its maximum and the other signal reaches its maximum.

As shown, FIG. 4 illustrates an improved process of executing a video game at a server to generate rendered video frames and sending those video frames to a client for display, in embodiments of the present disclosure. The process is shown with respect to generation and display of a single video frame at a server and client. In particular, the server generates a game rendered video frame at 401. For example, the server 260 includes a CPU (e.g., game title processing engine 211) configured for executing the game. The CPU generates one or more draw calls for a video frame, wherein the draw calls include commands placed into a command buffer for execution by a corresponding GPU of the server 260 in a graphics pipeline. The graphics pipeline may include one or more shader programs on vertices of objects within a scene to generate texture values as rendered for the video frame for displaying, wherein the operations are performed in parallel through a GPU for efficiency. At flip-time 409, the GPU reaches a flip command in the command buffer that indicates that the corresponding video frame has been completely generated and/or rendered and placed into the frame buffer at the server 260.

At 402, the server performs scan-out of the game rendered video frame to an encoder. In particular, scan-out is performed scanline by scanline, or in groups of consecutive scanlines, wherein a scanline refers to a single horizontal line, for example of a display from screen edge to screen edge. These scanlines or groups of consecutive scanlines are sometimes referred to as slices, and are referred to in this specification as screen slices. In particular, scan-out 402 may include a number of processes that modify the game rendered frame, including overlaying it with another frame buffer, or shrinking it in order to surround it with information from another frame buffer. During scan-out 402, the modified video frame is then scanned into an encoder for compression. In one embodiment, scan-out 402 is performed at an occurrence 311*a* of the VSYNC signal 311. In other embodiments, scan-out 402 may be performed before the occurrence of the VSYNC signal 311, such as at flip-time 409.

At 403, the game rendered video frame (which may have undergone modification) is encoded on an encoder slice by encoder slice basis at the encoder to generate one or more encoded slices, wherein an encoded slice is unrelated to a scanline or screen slice. As such, the encoder generates one or more encoded (e.g., compressed) slices. In one embodiment, the encoding process begins before the scan-out 402 process has fully completed for a corresponding video frame. Further, the start and/or end of encode 403 may or may not be aligned with the server VSYNC signal 311. The boundaries of an encoded slice are not restricted to a single scanline, and may be comprised of a single scanline, or multiple scanlines. Additionally, the end of an encoded slice and/or the start of the next encoder slice may not necessarily occur at the edges of the display screen (e.g., may occur somewhere mid-screen or in the middle of a scanline), such that the encoded slice need not traverse fully from edge to edge of the display screen. As shown, one or more encoded slices may be compressed and/or encoded, including "encoded slice A" that is compressed having hash marks.

At 404, the encoded video frame is transmitted from the server to the client, wherein the transmission may occur on an encoded slice-by-slice basis, wherein each encoded slice is an encoder slice that has been compressed. In one embodiment, the transmission process 404 begins before the encoding process 403 has fully completed for a corresponding video frame. Further, the start and/or end of transmission 404 may or may not be aligned with the server VSYNC signal 311. As shown, encoded slice A that is compressed is transmitted to the client independently of the other compressed encoder slices for the rendered video frame. The encoder slices may be transmitted one at a time, or in parallel.

At 405, the client receives the compressed video frame, again on an encoded slice-by-slice basis. Further, the start and/or end of receive 405 may or may not be aligned with the client VSYNC signal 312. As shown, encoded Slice A that is compressed is received by the client. Transmission jitter 452 may be present between the server 260 and client 210, wherein jitter 452 measures the variation in network latency from the server 260 to the client 210. A lower jitter value exhibits a more stable connection. As shown, the bold straight arrow shows the current latency when sending the corresponding video frame to the client 210, but due to jitter there may be a range of arrival times for video frames at the client 210 (e.g. range bounded by the dotted arrows). Variation in latency may also be due to one or more operations at the server such as encode 403 and transmission 404, as well as networking issues that introduce latency when transmitting video frames to the client 210.

At 406, the client decodes the compressed video frame, again on an encoded slice-by-slice basis, producing decoded Slice A (shown without hash marks) that is now ready for display. In one embodiment, the decode process 406 begins before the receive process 405 has fully completed for a corresponding video frame. Further, the start and/or end of decode 406 may or may not be aligned with the client VSYNC signal 312. At 407, the client displays the decoded rendered video frame on the display at the client. That is, the decoded video frame is placed in a display buffer which is streamed out on a scanline-by-scanline basis to a display device, for example. In one embodiment, the display process 407 (i.e. the streaming out to the display device) begins after the decode process 406 has fully completed for a corresponding video frame, i.e. the decoded video frame is fully resident in the display buffer. In another embodiment, the display process 407 begins before the decode process 406 has fully completed for a corresponding video frame. That is, streamout to the display device begins from the address of the display buffer at a time at which only a portion of the decoded frame buffer is resident in the display buffer. The display buffer is then updated or filled in with remaining portions of the corresponding video frame in time for displaying, such that the updating of the display buffer is performed prior to streamout of those portions to the display. Further, the start and/or end of display 407 is aligned with the client VSYNC signal 312.

In one embodiment, the one-way latency 416 between the server 260 and the client 210 may be defined as the elapsed time between when scan-out 402 begins and when display 407 begins. Embodiments of the present disclosure are capable of aligning the VSYNC signals (e.g. synchronize the frequency and adjust the offset) between the server and the client, to reduce one-way latency between the server and the client, and to reduce variability in the one-way latency between the server and the client. For example, embodiments of the present disclosure are able to calculate an optimal adjustment to the offset 430 between server VSYNC signal 311 and client VSYNC signal 312 such that even in the event of near worst case time needed for server processing such as encode 403 and transmit 404, near worst case network latency between server 260 and client 210, and near worst case client processing such as receive 405 and decode 406, the decoded rendered video frame is available in time for the display process 407. That is, it is not necessary to determine the absolute offset between server VSYNC and client VSYNC; it is sufficient to adjust the offset so that the decoded rendered video frame is available in time for the display process.

In particular, the frequencies of the server VSYNC signal 311 and the client VSYNC signal 312 may be aligned through synchronization. Synchronization is achieved through tuning the server VSYNC signal 311 or the client VSYNC signal 312. For purposes of illustration, tuning is described in relation to the server VSYNC signal 311, though it is understood that tuning could be performed on the client VSYNC signal 312 instead. For example, as shown in FIG. 4 the server frame period 410 (e.g., the time between two occurrences 311c and 311d of the server VSYNC signal 311) is substantially equal to the client frame period 415 (e.g., the time between two occurrences 312a and 312b of the client VSYNC signal 312), which indicates that the frequencies of the server VSYNC signal 311 and client VSYNC signal 312 are also substantially equal.

To maintain synchronization of the frequencies of the server and client VSYNC signals, the timing of the server VSYNC signal 311 may be manipulated. For example, the vertical blanking interval (VBI) in the server VSYNC signal 311 may be increased or reduced over a period of time, such as to account for the drift between the server VSYNC signal 311 and the client VSYNC signal 312. Manipulation of vertical blanking (VBLANK) lines in the VBI provides for adjusting the number of scanlines used for VBLANK for one or more frame periods of the server VSYNC signal 311. Dropping the number of scanlines of VBLANK reduces a corresponding frame period (e.g., time interval) between two occurrences of the server VSYNC signal 311. Conversely, increasing the number of scanlines of VBLANK increases a corresponding frame period (e.g., time interval) between two occurrences of the VSYNC signal 311. In that manner, the frequency of the server VSYNC signal 311 is adjusted to align the frequencies between the client and server VSYNC signals 311 and 312 to be at substantially the same frequency. Also, offset between server and client VSYNC signals can be adjusted by increasing or reducing the VBI for a short period of time, before returning the VBI to its original value. In one embodiment, the server VBI is adjusted. In another embodiment, the client VBI is adjusted. In yet another embodiment, instead of two devices (server and client), there are a plurality of connected devices, each of which may have a corresponding VBI that is adjusted. In one embodiment, each of the plurality of connected devices may be independent peer devices (e.g. without a server device). In another embodiment, the plurality of devices may include one or more server devices and/or one or more client devices arranged in one or more server/client architectures, multi-tenant server/client(s) architecture, or some combination thereof.

Alternatively, the pixel clock of the server (e.g., located at the southbridge of a northbridge/southbridge core logic chipset of the server, or in the case of discrete GPU, it would generate a pixel clock by itself using its own hardware) may be manipulated to perform coarse and/or fine tuning of the frequency of the server VSYNC signal 311 over a period of time to bring the synchronization of frequencies between server and client VSYNC signals 311 and 312 back into alignment, in one embodiment. Specifically, the pixel clock in the south bridge of the server may be overclocked or underclocked to adjust the overall frequency of the VSYNC signal 311 of the server. In that manner, the frequency of the server VSYNC signal 311 is adjusted to align the frequencies between the client and server VSYNC signals 311 and 312 to be at substantially the same frequency. Offset between server and client VSYNC can be adjusted by increasing or reducing the client server pixel clock for a short period of time, before returning the pixel clock to its original value. In one embodiment, the server pixel clock is adjusted. In another embodiment, the client pixel clock is adjusted. In yet another embodiment, instead of two devices (server and client), there are a plurality of connected devices, each of which may have a corresponding pixel clock which is adjusted. In one embodiment, each of the plurality of connected devices may be independent peer devices (e.g. without a server device). In another embodiment, the plurality of connected devices may include one or more server devices and one or more client devices arranged in one or more server/client architectures, multi-tenant server/client(s) architecture, or some combination thereof.

In one embodiment, high performance codecs (e.g., encoders and/or decoders) may be used to further reduce one-way latency between a cloud gaming server and a client. In traditional streaming systems (e.g., streaming movies, television shows, videos, etc.) that involve streaming of compressed media, when decompressing the streaming media at the end target (e.g., client), it is possible to buffer at the client a substantial amount of the decompressed video to accommodate for variances in encoding operations (e.g., longer encode times), transmission quality intruding jitter, and decoding operations (e.g., longer decode times). As such, in traditional streaming systems, it is possible to rely on average decode capabilities and metrics (e.g., average decode resources) because buffering of decoded content accommodates for the latency variability such that video frames can be displayed at a desired rate (e.g., support 4K media at 60 Hz, or displaying video frames at every occurrence of a client VSYNC signal).

However, buffering is very restricted (e.g., moving to zero buffering) in the cloud gaming environment so that real-time gaming can be realized. As a result, any variability introduced into the one-way latency between a cloud gaming server and client can adversely affect downstream operations. For example, taking a longer time to encode and/or decode a complex frame—even for a single frame—results in correspondingly higher one-way latency, which ultimately increases the response time to the user and adversely affects the real-time experience for a user.

In one embodiment, for cloud gaming it is beneficial to supply higher powered decoding and encoding resources that would appear to be unnecessary when compared to the needs of streaming video applications. In addition, the encoder resources should be optimized for time to handle frames that require the long or longest processing, as will be described more fully below. That is, in embodiments the encoder can be tuned to improve tradeoffs between one-way latency and video quality in cloud gaming systems, wherein encoder tuning may be based on monitoring of client bandwidth, skipped frames, number of encoded I-frames, number of scene changes, and/or number of video frames that exceed a target frame size, wherein tuned parameters may include encoder bit rate, target frame size, maximum frame size, and quantization parameter (QP) value, wherein high performance encoders and decoders help reduce the overall one-way latency between a cloud gaming server and client.

Figure 5:
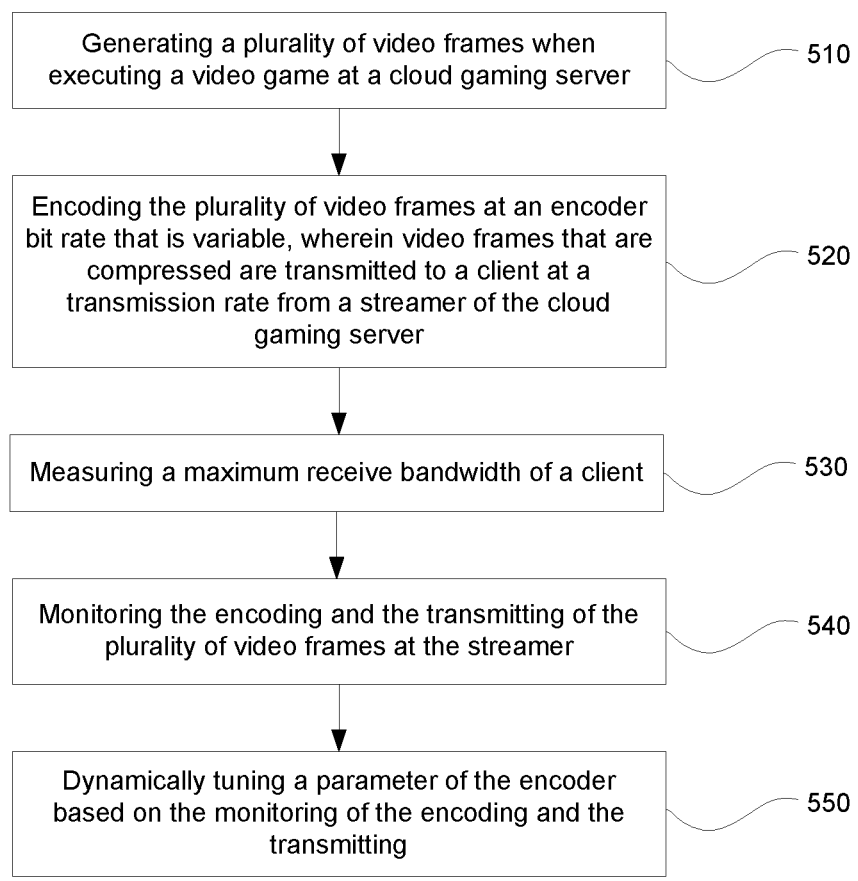
FIG. 5 is a flow diagram illustrating a method for cloud gaming, wherein encoding of video frames includes tuning of encoder parameters with an awareness of network transmission speeds and reliability, and overall latency targets, in accordance with one embodiment of the present disclosure.

With the detailed description of the various client devices 210 and/or the cloud gaming network 290 (e.g., in the game server 260) of FIGS. 2A-2D, flow diagram 500 of FIG. 5 illustrates a method for cloud gaming, wherein encoding of video frames includes tuning of encoder parameters with an awareness of network transmission speeds and reliability, and overall latency targets, in accordance with one embodiment of the present disclosure. The cloud gaming server is configured for streaming content to one or more client devices over a network. This process provides for smoother frame rates and more reliable latency, such that one-way latency between the cloud gaming server and a client is reduced and made more consistent, thereby improving smoothness of client display of video.

At 510, a plurality of video frames is generated when executing a video game at a cloud gaming server. In general, the cloud gaming server generates a plurality of game rendered video frames. For example, game logic of a video game is built upon a game engine or game title processing engine. The game engine includes core functionality that may be used by the game logic to build a gaming environment of the video game. For example, some functionalities of a game engine may include a physics engine for simulating physical forces and collisions on objects in the gaming environment, a rendering engine for 2D or 3D graphics, collision detection, sound, animation, artificial intelligence, networking, streaming, etc. In that manner, the game logic does not have to build from scratch the core functionalities provided by the game engine.

The game logic in combination with the game engine is executed by a CPU and GPU, wherein the CPU and GPU may be configured within an accelerated processing unit (APU). That is, the CPU and GPU along with shared memory may be configured as a rendering pipeline for generating the game rendered video frames, such that the rendering pipeline outputs game rendered images as video or image frames that are suitable for display, including corresponding color information for each of the pixels in a targeted and/or virtualized display. In particular, the CPU may be configured to generate one or more draw calls for a video frame, each draw call including commands stored in a corresponding command buffer that are executed by the GPU in a GPU pipeline. In general, a graphics pipeline may perform shader operations on vertices of objects within a scene to generate texture values for pixels of a display. In particular, the graphics pipeline receives input geometries (e.g., vertices of objects in a gaming environment), and a vertex shader builds the primitives or polygons that make up the objects. Vertex shader programs may perform lighting, shading, shadowing, and other operations on the primitives. Depth or z-buffering is performed to determine which objects are visible when rendered from a corresponding viewpoint. Rasterization is performed to project the objects in the 3D gaming environment to a 2D plane defined by the viewpoint. Pixel sized fragments are generated for the objects, wherein one or more fragments may contribute to the color of a pixel of an image. Fragments may be merged and/or blended to determine a combined color of each of the pixels in a corresponding video, and can be stored in a frame buffer. Subsequent video frames are generated and/or rendered for display using similarly configured command buffers, wherein the plurality of video frames is output from the GPU pipeline.

At 520, the method includes encoding the plurality of video frames at an encoder bit rate. In particular, the plurality of video frames is scanned into an encoder to be compressed before streaming to the client using a streamer operating at an application layer. In one embodiment, each of the game rendered video frames may be composited and blended with additional user interface features into a corresponding modified video frame that is then scanned into the encoder, wherein the encoder compresses the modified video frame for streaming to the client. For purposes of brevity and clarity, the method of tuning encoder parameters disclosed in FIG. 5 is described with reference to encoding the plurality of video frames, but is understood to support the encoding of modified video frames. The encoder is configured to compress the plurality of video frames based on a described format. For example, the motion pictures experts group (MPEG) or H.264 standards may be implemented when streaming media content from the cloud gaming server to the client. In particular, the encoder may perform compression by video frames, or by encoder slices of the video frames, wherein each video frame may be compressed as one or more encoded slices, as previously described. Generally, when streaming media a video frame may be compressed as an I-frame (Intra-frame) or a P-frame (Predicted-frame), each of which can be partitioned into encoded slices.

Figure 6:
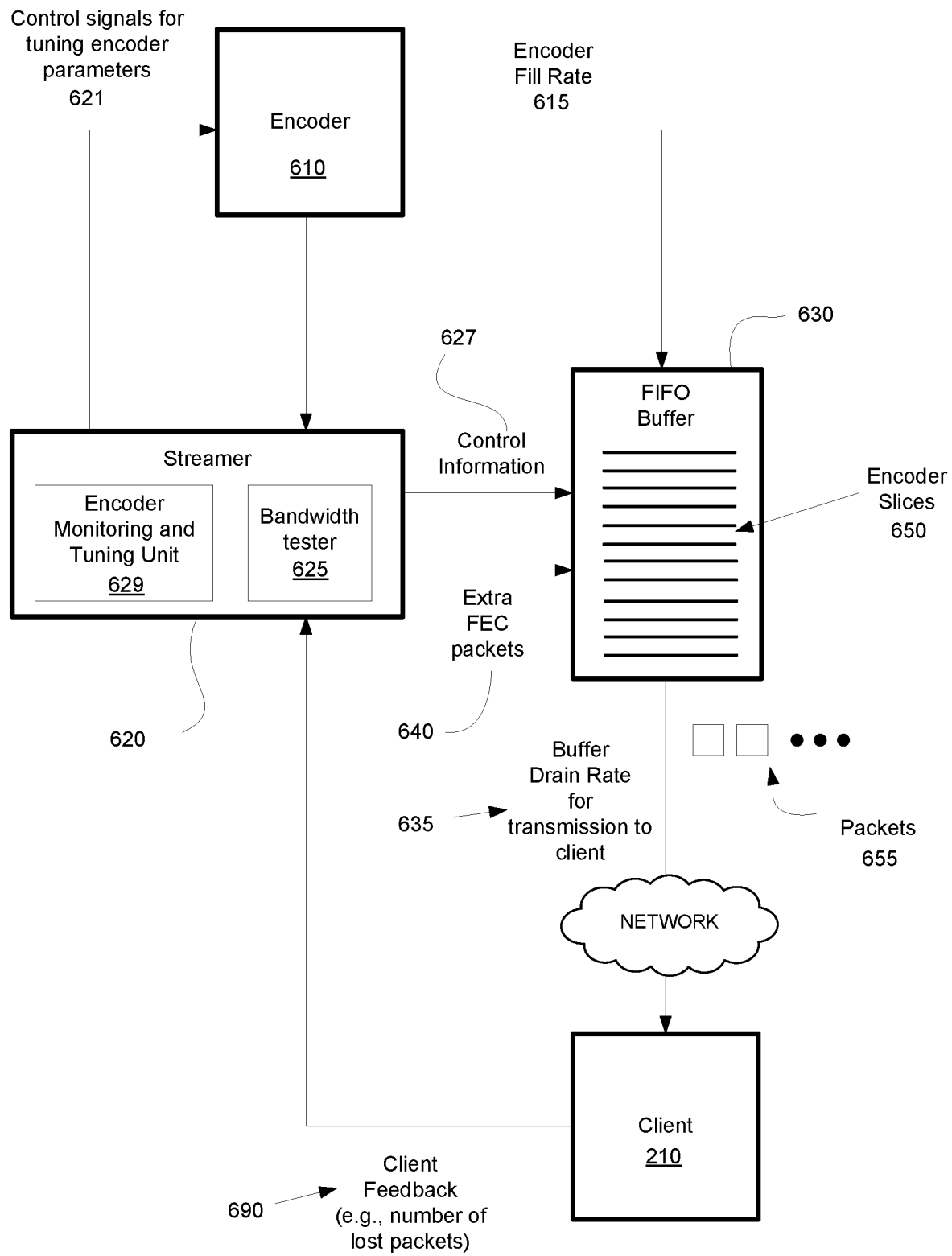
FIG. 6 is a diagram illustrating the measurement of bandwidth for a client by a streamer component operating at an application layer, wherein the streamer is configured to monitor and tune an encoder so that video frames that are compressed can be transmitted at a rate that is within the measured bandwidth of the client, in accordance with one embodiment of the present disclosure.

At 530, a maximum receive bandwidth of a client is measured. In one embodiment, the maximum bandwidth experienced by the client is determined by means of a feedback mechanism from the client. FIG. 6 illustrates the measurement of bandwidth for a client 210 by a streamer of a cloud gaming server, wherein the streamer 620 is configured to monitor and tune an encoder 610 so that video frames that are compressed can be transmitted at a rate that is within a measured bandwidth of a client, in accordance with one embodiment of the present disclosure. As shown, the compressed video frames, encoded slices, and/or packets are delivered from the encoder 610 a buffer 630 (e.g., first-in/first-out—FIFO). The encoder delivers the compressed video frames at an encoder fill rate 615. For example, the buffer may be filled as fast as the encoder is able to generate compressed video frames, encoded slices 650, and/or packets 655 of the encoded slices. In addition, the compressed video frames are drained from the buffer at a buffer drain rate 635 for delivery to the client 210 over network 250. In one embodiment, the buffer drain rate 635 is dynamically tuned to a measured maximum receive bandwidth of the client. For example, the buffer drain rate 635 may be adjusted to be approximately equal to the measured maximum receive bandwidth of the client. In one embodiment, the encoding of packets is performed at the same rate that they are transmitted, such that both operations are dynamically tuned to the maximum available bandwidth available to the client.

In particular, the streamer 620 operating at the application layer measures the maximum bandwidth of the client 210, such as using bandwidth tester 625. The application layer is used in the user datagram protocol/internet protocol (UDP/IP) suite of protocols used to interconnect network devices over the internet. For example, the application layer defines the communications protocols and interface methods used for communicating between devices over an IP communications network. During the test, the streamer 620 provides extra buffered packets 640 (e.g., forward error correction—FEC—packets) so that the buffer 630 can stream packets out a predefined bit rate, such as a tested maximum bandwidth. In one embodiment, the client returns as feedback 690 to the streamer 620 a number of packets it has received over a range of incremental sequence identifiers (IDs), such as for a range of video frames. For example, the client may report something like, 145 of 150 video frames received for sequence IDs 100 to 250 (e.g., 150 video frames). As such, the streamer 620 at the server 260 is able to calculate the packet loss, and since the streamer 620 knows the amount of bandwidth that was being sent (e.g., as tested) during that sequence of packets, the streamer 620 can dynamically determine what the client's maximum bandwidth is at a particular moment in time. The measured maximum bandwidth of the client may be delivered from streamer 620 to the buffer 630 as control information 627, so that the buffer 630 can dynamically transmit packets at a rate that is approximately equal to the maximum bandwidth of the client. As such, the rate of transmission of compressed video frames, encoded slices, and/or packets can be adjusted dynamically according to the currently measured maximum bandwidth of the client.

At 540, the encoding process is monitored by the streamer. That is, the encoding of the plurality of video frames is monitored. In one embodiment, the monitoring is performed at the client 210, with feedback and/or tuning control signals provided back to the encoder. In another embodiment, the monitoring is performed at the cloud gaming serve 260, such as by the streamer 620. For example, monitoring of the encoding of video frames may be performed by the monitoring and tuning unit 629 of streamer 620. Various encoding characteristics and/or operations may be tracked and/or monitored. For example, the incidences of I-frames within the plurality of video frames may be tracked and/or monitored, in one embodiment. In addition, the incidences of scene changes within the plurality of video frames may be tracked and/or monitored, in one embodiment. Also, the number of video frames that exceed the target frame size may be tracked and/or monitored, in one embodiment. Also, the encoder bit rate used for encoding one or more video frames may be tracked and/or monitored, in one embodiment.

At 550, a parameter of the encoder is dynamically tuned based on the monitoring of the encoding of video frames. That is, the monitoring of the encoding of the video frames will influence how the encoder operates when compressing current and future video frames that are received at the encoder. In particular, the monitoring and tuning unit 629 is configured to determine which encoder parameters should be tuned in response to the monitoring of the encoding of the video frames, and analysis performed on the monitored information. Control signal 621 are delivered back to the encoder 610 from the monitoring and tuning unit 629 that are used to configure the encoder. Encoder parameters for tuning include quantization parameters (QP) (e.g., minQP, maxQP) or quality parameters, target frame size, maximum frame size, etc.

Tuning is performed with an awareness of network transmission speeds and reliability, and overall latency targets. In one embodiment, smoothness of video playback is favored over low latency or image quality. For example, skipping encoding of one or more video frames is disabled. Specifically, the balance between image resolution or quality (e.g., at 60 Hz) and latency is tuned using various encoder parameters. In particular, because VSYNC signals at the cloud gaming server and client can be synchronized and offset, one-way latency between the cloud gaming server and client can be reduced, thereby leading to a decreased need to skip video frames to promote low latency. Synchronization and offset of VSYNC signals also provides for overlapping operations (scan-out, encode, and transmit) at the cloud gaming server; overlapping operations (receive, decode, render, display) at the client; and/or overlapping operations at the cloud gaming server and the client—all of which promote reductions in one-way latency, reductions in the variability in one-way latency, real-time generation and display of video content, and consistent video playback at the client.

In one embodiment, the encoder bit rate is monitored with consideration of upcoming frames and their complexity (e.g., predicted scene changes) to anticipate demand on the client bandwidth, and wherein the encoder bit rate can be adjusted according to the anticipated demand. For example, when favoring smoothness of video playback the encoder monitoring and tuning unit 629 may be configured to determine that the encoder bit rate used exceeds the maximum receive bandwidth that is measured. In response, the encoder bit rate may be lowered, such that frame sizing may also be lowered. When favoring smoothness, it is desired to use an encoder bit rate that is lower than the max receive bandwidth (e.g. encoder bit rate of 10 megabits per second for a maximum receive bandwidth of 15 megabits per second). In that manner, if the encoded frame spikes above the maximum frame size, the encoded frame can still be sent out within 60 Hz (hertz). In particular, encoder bit rate may be translated to a frame size. A given bit rate and target speed of the video game (e.g., 60 frames per second) will translate to an average size of an encoded video frame. For example, at an encoder bit rate of 15 megabits per second, and a given target speed of 60 frames per second, wherein 60 encoded frames share the 15 megabits, such that each encoded frame has approximately 250 k encoded bits. As such, controlling the encoder bit rate will also control the frame size of encoded video frames, such that increasing the encoder bit rate gives more bits for encoding (more precision), and decreasing the encoder bit rate gives less bits for encoding (less precision). Similarly, when the encoder bit rate used to encode a group of video frames is within the maximum receive bandwidth that is measured, the encoder bit rate may be increased, such that frame sizing may also be increased.

In one embodiment, when favoring smoothness of video playback the encoder monitoring and tuning unit 629 may configured to determine that the encoder bit rate used to encode a group of video frames from the plurality of video frames exceeds the maximum receive bandwidth that is measured. For example, the encoder bit rate may be detected to be at 15 megabits per second (Mbps), whereas the maximum receive bandwidth may currently be at 10 Mbps. In that manner, the encoder is pushing out more bits than can be transmitted to the client without an increase in one-way latency. As previously introduced, when favoring smoothness, it may be desired to use an encoder bit rate that is lower than the max receive bandwidth. In the above example, it may be acceptable to have the encoder bit rate set to be at or below 10 megabits per second for the maximum receive bandwidth of 10 megabits per second introduced above. In that manner, if the encoded frame spikes above the maximum frame size, the encoded frame can still be sent out within 60 Hz. In response, a QP value may be tuned with or without a lowering of the encoder bit rate, wherein QP controls the precision used when compressing a video frame. That is, QP controls how much quantization is performed (e.g., compressing a variable range of values in a video frame into a single quantum value). In H.264, QP ranges from "0" to "51." For example, a QP value of "0" means there is less quantization, less compression, more precision, and higher quality. A QP value of "51" means there is more quantization, more compression, less precision, and lower quality. Specifically, a QP value may be increased, such that encoding of video frames is performed with less precision.

In one embodiment, when favoring smoothness of video playback the encoder monitoring by the monitoring and tuning unit 629 may configured to determine that the encoder bit rate used to encode a group of video frames from the plurality of video frames is within the maximum receive bandwidth. As previously introduced, when favoring smoothness, it may be desired to use an encoder bit rate that is lower than the max receive bandwidth. As such, there is excess bandwidth available when sending the group of video frames. The excess bandwidth may be determined. In response, a QP value may be tuned, wherein QP controls the precision used when compressing a video frame. In particular, a QP value may be decreased based on the excess bandwidth, such that encoding is performed with more precision.

In another embodiment, characteristics of the individual video game is considered when deciding I-frame handling and QP setting, especially when favoring smoothness of video playback. For example, if a video game has infrequent "scene changes" (e.g., only camera cuts), then it may be desirable to allow I-frames to become larger (low QP or higher encoder bit rate). That is, within a group of video frames from the plurality of video frames being compressed, a number of video frames identified as having a scene change is determined to be lower than a threshold number of scene changes. That is, the streaming system can handle the number of scene changes for current conditions (e.g., measured client bandwidth, required latency, etc.). In response, a QP value may be tuned, wherein QP controls the precision used when compressing a video frame. In particular, a QP value may be decreased, such that encoding is performed with more precision.

On the other hand, if a video game has frequent "scene changes" during gameplay, then it may be desirable to keep I-frame size smaller (e.g., QP high, or lower encoder bit rate). That is, within a group of video frames from the plurality of video frames being compressed, a number of video frames identified as having a scene change is determined to meet or exceed a threshold number of scene changes. That is, the video game is generating too many scene changes for current conditions (e.g., measured client bandwidth, required latency, etc.). In response, a QP value may be tuned, wherein QP controls the precision used when compressing a video frame. In particular, a QP value may be increased, such that encoding is performed with less precision.

In another embodiment, encoding patterns may be considered when deciding I-frame handling and QP setting, especially when favoring smoothness of video playback. For example, if the encoder has infrequent I-frame generation, then it may be desirable to allow I-frames to become larger (low QP or higher encoder bit rate). That is, within a group of video frames from the plurality of video frames being compressed, a number of video frames that is compressed as I-frames falls within or is lower than a threshold number of I-frames. That is, the streaming system can handle the number of I-frames for current conditions (e.g., measured client bandwidth, required latency, etc.). In response, a QP value may be tuned, wherein QP controls the precision used when compressing a video frame. In particular, a QP value may be decreased, such that encoding is performed with more precision.

If the encoder has frequent I-frame generation, then it may be desirable to keep I-frame size smaller (e.g., QP high, or lower encoder bit rate). That is, within a group of video frames from the plurality of video frames being compressed, a number of video frames that is compressed as I-frames meets or exceeds a threshold number of I-frames. That is, the video game is generating too many I-frames for current conditions (e.g., measured client bandwidth, required latency, etc.). In response, a QP value may be tuned, wherein QP controls the precision used when compressing a video frame. In particular, a QP value may be increased, such that encoding is performed with less precision.

In another embodiment, encoding patterns may be considered when turning the encoder, especially when favoring smoothness of video playback. For example, if an encoder frequently is below the target frame size, then it may be desirable to allow the target frame size to become larger. That is, within a group of video frames from the plurality of video frames being compressed and transmitted at a rate of transmission, a number of video frames is determined to be lower than a threshold. Each of the number of video frames is within a target frame size (i.e., equal to or smaller than the target frame size). In response, at least one of a target frame size and a maximum frame size is increased.

On the other hand, if an encoder is frequently above the target frame size, then it may be desirable to allow the target frame size to become smaller. That is, within a group of video frames from the plurality of video frames being compressed and transmitted at a rate of transmission, a number of video frames is determined to meet or exceed a threshold. Each of the number of video frames exceeding the target frame size. In response, at least one of a target frame size and a maximum frame size is lowered.

Figure 7A:
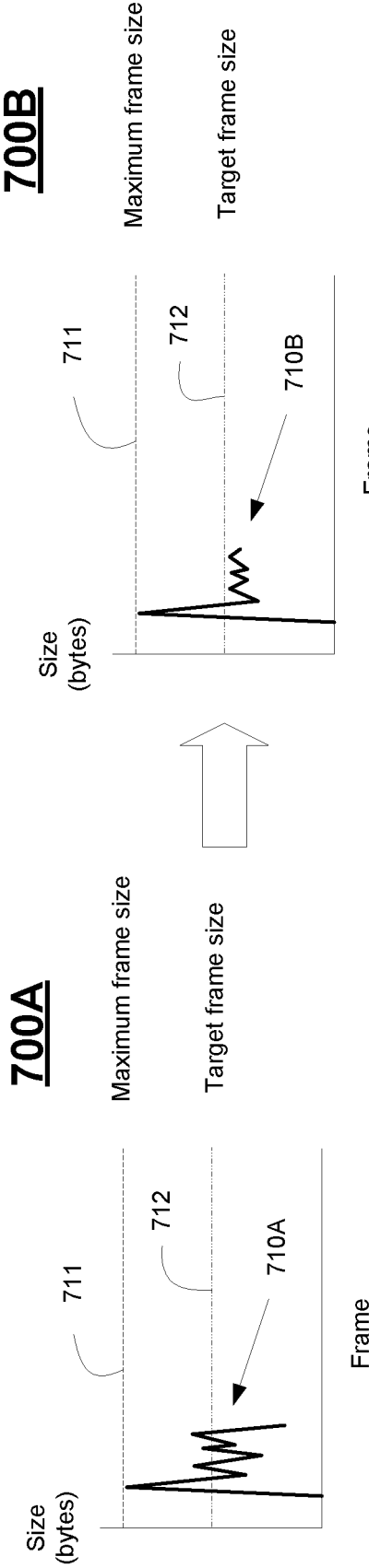
FIG. 7A is a diagram illustrating the setting of a quantization parameter (QP) of an encoder to optimize quality and buffer utilization at the client, in accordance with one embodiment of the present disclosure.

FIG. 7A is a diagram illustrating the setting of a quantization parameter (QP) of an encoder to optimize quality and buffer utilization at the client, in accordance with one embodiment of the present disclosure. Graph 700A shows frame size (in bytes) in the vertical direction for each frame generated, as shown in the horizontal direction. Target frame size and maximum frame size are static. In particular, line 711 shows the maximum frame size, and line 712 shows the target frame size, wherein maximum frame size is higher than the target frame size. As shown in graph 700A, there are multiple peaks including video frames as compressed that exceed the target frame size of line 712. Video frames that exceed the target frame size are at risk of introducing playback jitter (e.g., increasing one-way latency), as they may take more than one frame period for encoding and/or transmission from the cloud gaming server.

Graph 700B shows encoder response after QP has been set based on target frame size, maximum frame size, QP range (e.g., minQP and maxQP) to optimize quality of encoding and buffer utilization at the client. For example, QP may adjusted and/or tuned based on encoder monitoring of encoder bit rate, frequency of scene changes, and frequency of I-frame generation, as previously described. Graph 700B shows frame size (in bytes) in the vertical direction for each frame generated, as shown in the horizontal direction. Target frame size of line 712 and maximum frame size of line 711 remain in the same position as in graph 700A. After QP tuning and/or adjusting, the number of peaks including video frames as compressed that exceed the target frame size of line 712 is reduced when compared to graph 700A. That is, QP has been tuned to optimize encoding of video frames (i.e., fall within the target frame size) for current conditions (e.g., measured client bandwidth, required latency, etc.).

Figure 7B:
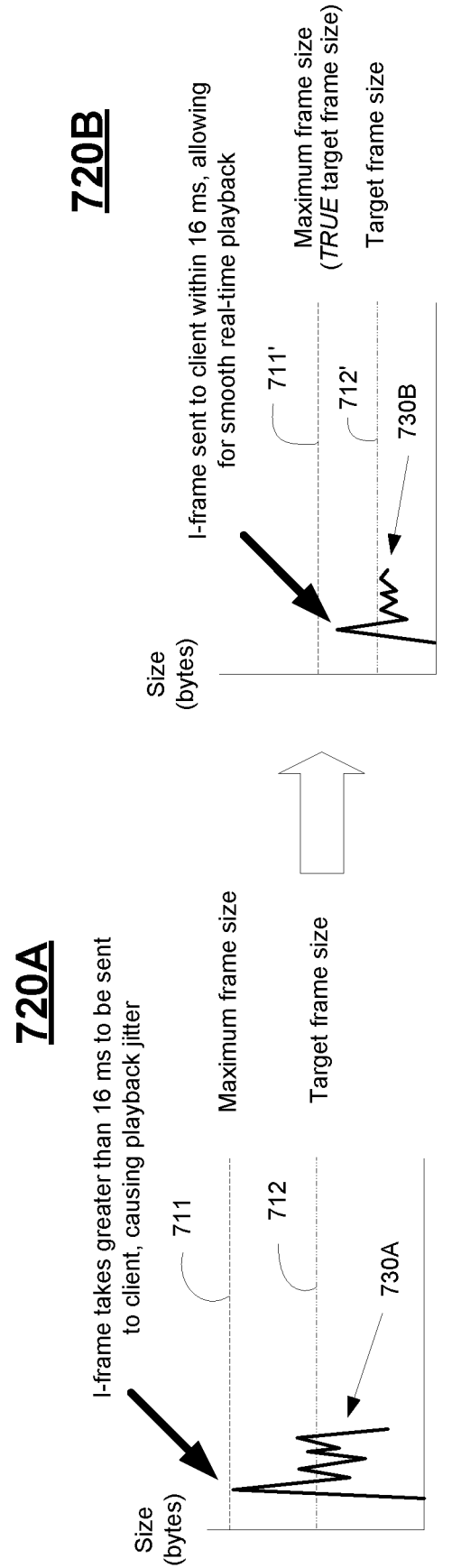
FIG. 7B is a diagram illustrating the tuning of target frame size, maximum frame size, and/or QP (e.g., minQP and/or maxQP) encoder settings to reduce the occurrence of I-frames that exceed the true target frame size supported by a client, in accordance with one embodiment of the present disclosure.

FIG. 7B is a diagram illustrating the tuning of target frame size, maximum frame size, and/or QP (e.g., minQP and/or maxQP) encoder settings to reduce the occurrence of I-frames that exceed the TRUE target frame size supported by a client, in accordance with one embodiment of the present disclosure. For example, QP may adjusted and/or tuned based on encoder monitoring of encoder bit rate, frequency of scene changes, and frequency of I-frame generation, as previously described.

Graph 720A shows frame size (in bytes) in the vertical direction for each frame generated, as shown in the horizontal direction. For purposes of illustration, graph 720A of FIG. 7B and graph 700A of FIG. 7A may reflect similar encoder conditions and are used for encoder tuning. In graph 720A, target frame size and maximum frame size are static. In particular, line 711 shows the maximum frame size, and line 712 shows the target frame size, wherein maximum frame size is higher than the target frame size. As shown in graph 720A, there are multiple peaks including video frames as compressed that exceed the target frame size of line 712. Video frames that exceed the target frame size are at risk of introducing playback jitter (e.g., increasing one-way latency), as they may take more than one frame period for encoding and/or transmission from the cloud gaming server.

For example, the peak that reaches the maximum frame size at line 711 may be an I-frame that takes greater than 16 ms to be sent to the client, which causes playback jitter by increasing one-way latency between the cloud gaming server and the client.

Graph 720B shows encoder response after at least one of target frame size and/or maximum frame size has been tuned to reduce the occurrence of I-frames that exceed the TRUE target frame size supported by a client. The TRUE target frame size may be adjusted based on the client bandwidth that is measured, and/or encoder monitoring, including monitoring of encoder bit rate, frequency of scene changes, and frequency of I-frame generation, as previously described.

Graph 720B shows frame size (in bytes) in the vertical direction for each frame generated, as shown in the horizontal direction. Target frame size of line 712' and maximum frame size of line 711' have been lowered in value when compared to graph 720A. For example, target frame size of line 712' has been lowered in value from line 712, and maximum frame size of line 711' has been lowered in value from line 711. After tuning of the target frame size and/or the maximum frame size, the maximum sizes of the peaks of video frames as compressed exceeding the target frame size 712' are reduced for better transmission. In addition, the number of peaks including video frames as compressed that exceed the target frame size 712' has also been reduced when compared to graph 700A. For example, there is only one peak shown in graph 720B. That is, target frame size and/or maximum frame size has been tuned to optimize encoding of video frames (i.e., fall within the target frame size) for current conditions (e.g., measured client bandwidth, required latency, etc.).

Figure 8:
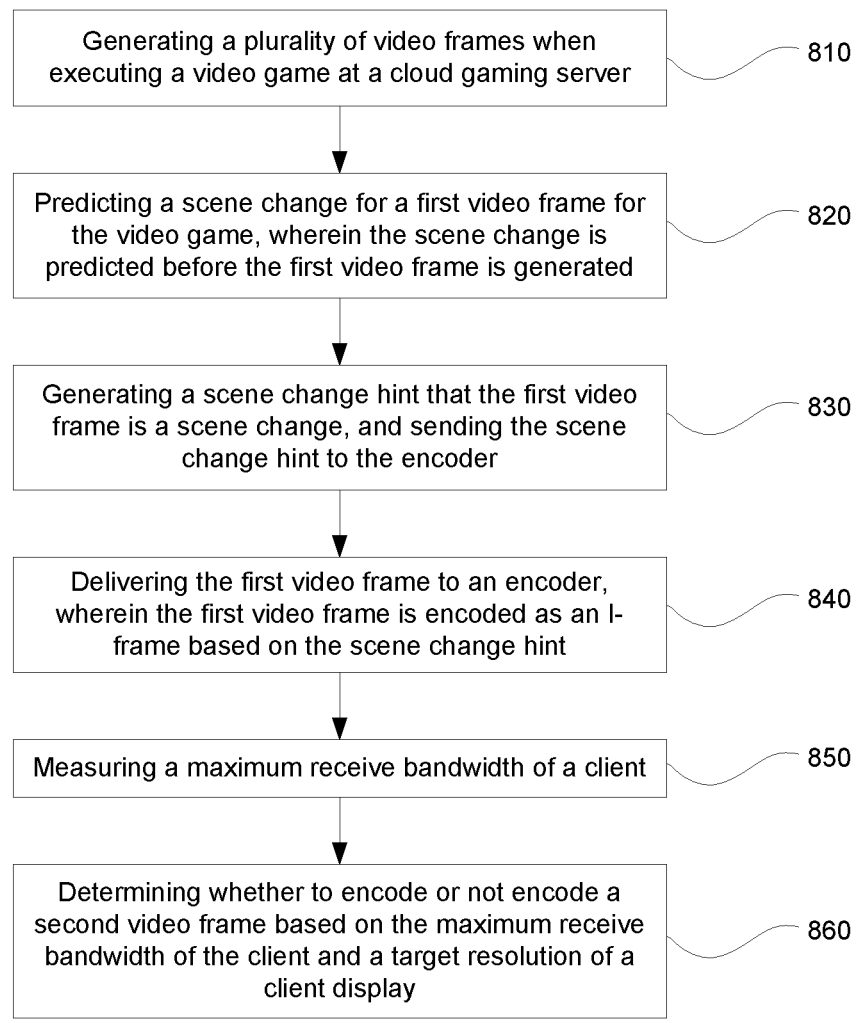
FIG. 8 is a flow diagram illustrating a method for cloud gaming, wherein encoding of video frames includes deciding when to skip video frames or to delay encoding and transmission of video frames when encoding runs long or when video frames being generated is large, such as when encoding an I-frame, in accordance with one embodiment of the present disclosure.

With the detailed description of the various client devices 210 and/or the cloud gaming network 290 (e.g., in the game server 260) of FIGS. 2A-2D, flow diagram 800 of FIG. 8 illustrates a method for cloud gaming, wherein encoding of video frames includes deciding when to skip video frames or to delay encoding and transmission of video frames when encoding runs long or when video frames being generated is large, such as when encoding an I-frame, in accordance with one embodiment of the present disclosure. In particular, the decision to skip video frames is made with an awareness of network transmission speeds and reliability, as well as overall latency targets. This process provides for smoother frame rates and more reliable latency, such that one-way latency between the cloud gaming server and a client is reduced and made more consistent, thereby improving smoothness of client display of video.

At 810, a plurality of video frames is generated when executing a video game at a cloud gaming server operating in a streaming mode. In general, the cloud gaming server generates a plurality of game rendered video frames. For example, the generation of game rendered video frames has been described at 510 of FIG. 5, and is applicable to the generation of video frames in FIG. 8. For example, game logic of a video game is built upon a game engine or game title processing engine. The game logic in combination with the game engine is executed by a CPU and GPU, wherein the CPU and GPU along with shared memory may be configured as a rendering pipeline for generating the game rendered video frames, such that the rendering pipeline outputs game rendered images as video or image frames that are suitable for display, including corresponding color information for each of the pixels in a targeted and/or virtualized display.

At 820, a scene change is predicted for a first video frame for the video game, wherein the scene change is predicted before the first video frame is generated. In one embodiment, the game logic can be made aware of scene changes while the CPU is executing a video game. For example, the game logic or add-on logic may include code (e.g., scene change logic) that predicts scene changes when generating video frames, such as predicting a range of video frames includes at least one scene change, or predicting that a particular video frame is a scene change. In particular, the game logic or add-on logic configured for scene change prediction analyzes game state data collected during the execution of the video game to determine, and/or anticipate, and/or predict when there is a scene change, such as in the next X number of frames (e.g., range), or for an identified video frame. For example, a scene change may be predicted when a character is moving from one scene to another scene in a virtualized gaming environment, or when a character has ended a level and is transitioning to another level in the video game, when transitioning between scenes between two video frames (e.g., scene cut in a cinematic sequence, or start of interactive gameplay after a series of menus), etc. a scene change may be represented by a video frame that includes large and complex scenes of a virtualized gaming world or environment.

Game state data may define the state of the game at that point, and may include game characters, game objects, game object attributes, game attributes, game object state, graphic overlays, location of a character within a gaming world of the game play of the player, the scene or gaming environment of the game play, the level of the gaming application, the assets of the character (e.g., weapons, tools, bombs, etc.), loadout, skills set of the character, game level, character attributes, character location, number of lives left, the total possible number of lives available, armor, trophy, time counter values, and other asset information, etc. In that manner, game state data allows for the generation of the gaming environment that existed at the corresponding point in the video game.

At 830, a scene change hint is generated, and the scene change hint is sent to the encoder, wherein the hint indicates that the first video frame is a scene change. As such, notification of an upcoming scene change may be provided to the encoder, such that the encoder may adjust its encoding operations when compressing the identified video frame. The notification provided as a scene change hint may be delivered through an API used to communicate between components or between applications running on components of the cloud gaming server 260. In one embodiment, the API may be a GPU API. For example the API may be running on or called by the game logic and/or add-on logic configured to detect scene changes to communicate with the encoder. In one embodiment, the scene change hint may be provided as a data control packet formatted in such a manner that all components receiving the data control packet is able to understand what type of information is included in the data control packet, and understands the proper referencing to the corresponding rendered video frame. In one implementation, the communications protocol used for the API, the formatting for the data control packets may be defined in the corresponding software development kit (SDK) for the video game.

At 840, delivering the first video frame to an encoder. As previously described, the game generated video frame may be composited and blended with additional user interface features into a modified video frame that is scanned to the encoder. The encoder is configured to compress the first video frame based on a desired format, such as MPEG or H.264 standards used for streaming media content from a cloud gaming server to a client. When streaming, video frames are encoded as P-frames until there is a scene change or when the currently encoded frame no longer may reference a key frame (e.g., the previous I-frame), such that the next video frame is then encoded as another I-frame. In this case, the first video frame is encoded as an I-frame based on the scene change hint, wherein the I-frame may be encoded without reference to any other video frames (e.g., stand-alone as a key image).

At 850, a maximum receive bandwidth of a client is measured. As previously described, the maximum bandwidth experienced by the client may be determined by means of a feedback mechanism from the client, as illustrated in operation 530 of FIG. 5 and FIG. 6. In particular, a streamer of a cloud gaming server may be configured to measure the bandwidth of the client.

At 860, the encoder receives a second video frame. That is, the second video frame is received after the scene change, and is compressed after the first video frame has been compressed. Also, a decision is made by the encoder to either not encode the second video frame (or subsequent video frames), or to delay encoding the second video frame (or subsequent video frames). The decision is made based on the maximum receive bandwidth of the client and a target resolution of a client display. That is, the decision to skip or delay encoding takes into consideration the available bandwidth to the client. In general, if the current bandwidth experienced by the client is sufficient such that video frames generated and encoded for a target display of the client can quickly return to low one-way latency after taking a latency hit (e.g., generating a large I-frame for a scene change), then the second video frame (and/or subsequent video frames) may still be encoded with a delay. On the other hand, if the current bandwidth experienced by the client is not sufficient, the second video frame (and/or subsequent video frames) may be skipped during the encoding process, and not delivered to the client. As such, if bandwidth to the client exceeds that needed to support target resolution of a display at a client, it is possible to have fewer skipped frames (and lower latency).

In one embodiment, the compressed video frames are transmitted from the server at a rate based on the maximum available bit rate or bandwidth over the network to the client at a particular point in time. As such, the rate of transmission of encoded slices and/or packets of the encoded slices of the compressed video frames is adjusted dynamically according to the currently measured maximum bandwidth. The video frames may be transmitted as the video frames are encoded, such that transmission occurs as soon as encoding is completed without waiting for the next occurrence of a server VSYNC signal, and without waiting for the entire video frame to be encoded.

In addition, in one embodiment the encoding of packets is performed at the same rate that they are transmitted, such that both operations are dynamically tuned to the maximum available bandwidth available to the client. Also, the encoder bit rate can be monitored with consideration of upcoming frames and their complexity (e.g., predicted scene changes) to anticipate demand on the client bandwidth, and wherein the encoder bit rate can be adjusted according to the anticipated demand. Further, the encoder bit rate may be communicated to the client, so that the client can adjust decode speeds accordingly, such as to match the encoder bit rate.

In one embodiment, when a transmission rate to the client is low for a target resolution of a client display, then the second video frame is skipped by the encoder. That is, the second video frame is not encoded. In particular, the transmission rate to the client for a group of video frames as compressed exceeds the maximum receive bandwidth. For example, the transmission rate to the client may be at 15 megabits per second (Mbps), but the measured receive bandwidth of the client may be currently at 5-10 Mbps. As such, the one-way latency between the cloud gaming server and the client is increased if all the video frames are continually pushed to the client. In an effort to promote low latency, the second and/or subsequent video frames may be skipped by the encoder.

Figure 9A:
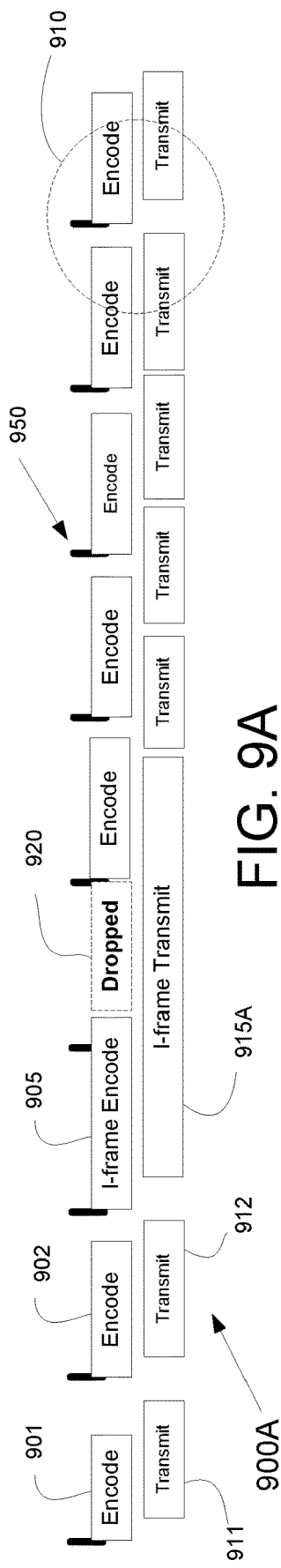
FIG. 9A illustrates a sequence of video frames that is compressed by an encoder, wherein the encoder drops encoding of a video frame after encoding an I-frame when the client bandwidth is low for a target resolution of a display of a client, in accordance with one embodiment of the present disclosure.

FIG. 9A illustrates a sequence 900A of video frames that is compressed by an encoder, wherein the encoder drops encoding of a second video frame 920 after encoding a first I-frame 905 when the client bandwidth is low for a target resolution of a display of a client, in accordance with one embodiment of the present disclosure. Encode blocks and transmit blocks of video frames are shown in relation to a VSYNC signal 950. In particular, if no excess bandwidth is available, I-frames that take longer to encode will cause one or more skipped frames in an effort to keep low one-way latency a priority, wherein one-way latency may include the time to display video frames at the client. As shown skipping one or more video frames after an I-frame allows for immediate return to low one-way latency (e.g., within one or two frame periods). Otherwise, by not skipping encoding of video frames it will take several frame periods to return to low one-way latency.

For example, the sequence 900A of video frames includes one encoded I-frame 905, with the remaining frames encoded as P-frames. For illustration, encode block 901 and encode block 902 as P-frames are encoded before encode block 905 encoded as an I-frame. Afterwards, the encoder compresses the video frames as P-frames until the next scene change, or until a video frame cannot reference a previous key frame (e.g., I-frame). In general, the encode time for an I-frame block may take longer than a P-frame block. For example, the encode time for I-frame block 905 may exceed one frame period. In some cases, the encode time between a P-frame and an I-frame may generally be about the same, especially when using high powered encoders.

However, transmission times between an I-frame and a P-frame differ greatly. As shown, various transmit times are shown in relation to corresponding encoded video frames. For example, the transmission block 911 for encoded P-frame block 901 is shown with low latency, such that the encode block 901 and transmit block 911 may be performed within one frame period. Also, transmission block 912 for encoded P-frame block 902 is shown with low one-way latency, such that the encode block 902 and transmit block 912 may also be performed within one frame period.

On the other hand, the transmission block 915A for encoded I-frame block 905 is shown with higher one-way latency, such that the encode block 905 and the transmit block 915A occurs over several frame periods, thereby introducing jitter in the one-way latency between the cloud gaming server and the client. In an effort to bring a real-time experience to the user such that there is low one-way latency, buffers at the client may not be used to correct for jitter. In that case, the encoder may decide to skip encoding of one or more video frames after an I-frame is encoded. For example, video frame 920 is dropped by the encoder. In that case, the transmission of encoded video frames returns back to one of low one-way latency around highlighted region 910, such as after 5 subsequent video frames have been encoded as P-frames and transmitted to the client. That is, the fourth or fifth P-frame encoded after I-frame block 905 is encoded is also transmitted to the client within the same frame period, thereby returning to low one-way latency between the cloud gaming server and client.

In one embodiment, when a transmission rate to the client is high for a target resolution of a client display, then the second video frame is still compressed by the encoder after a delay (i.e., wait till the I-frame has been encoded). In particular, the transmission rate to the client for a group of video frames as compressed is within the maximum receive bandwidth. For example, the transmission rate to the client may be at 13 megabits per second (Mbps), but the measured receive bandwidth of the client may be currently at 15 Mbps. As such, there is no increase in one-way latency between the cloud gaming server and the client, as there is no delay in receiving the encoded video frames at the client.

Further, because VSYNC signals at the cloud gaming server and client can be synchronized and offset, one-way latency between the cloud gaming server and client can be reduced, thereby compensating for any variability in latency introduced by jitter at the server, during transmission over a network, or at the client. Also, the synchronization and offset of VSYNC signals also provides for overlapping operations (scan-out, encode, and transmit) at the cloud gaming server; overlapping operations (receive, decode, render, display) at the client; and/or overlapping operations at the cloud gaming server and the client—all of which promote compensation for variability in latency introduced by server or network or client jitter, reductions in one-way latency, reductions in the variability in one-way latency, real-time generation and display of video content, and consistent video playback at the client.

Figure 9B:
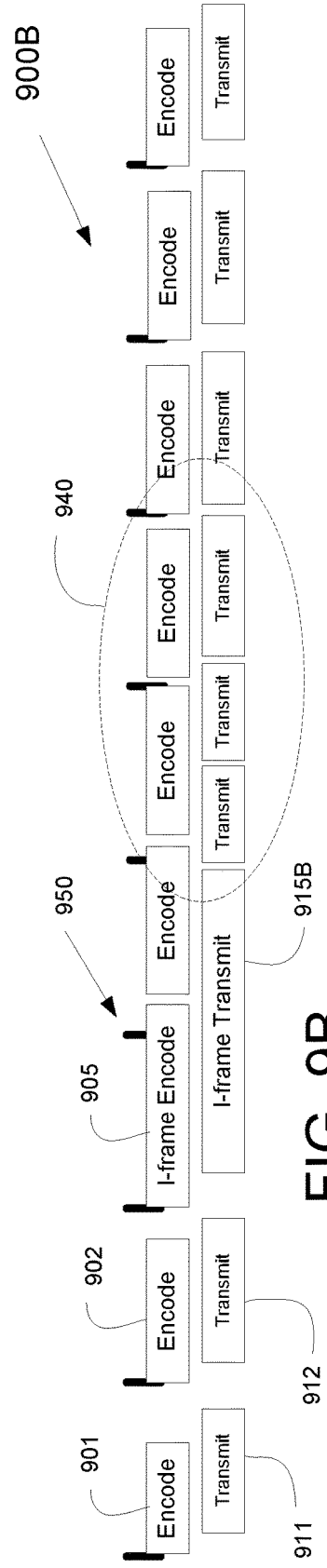
FIGS. 9B-9C illustrate sequences of video frames that are compressed by an encoder, wherein each of the sequences a video frame is encoded as an I-frame, and subsequent video frames are also encoded after a delay of encoding the I-frame when the client bandwidth is moderate or high for a target resolution of a display of a client, in accordance with one embodiment of the present disclosure.

FIG. 9B illustrates a sequence 900B of video frames that is compressed by an encoder, wherein the encoder takes into consideration the available bandwidth to the client, such that if bandwidth exceeds that needed to support target resolution of a client display, it is possible to have none or fewer skipped frames, while still having lower latency, in accordance with one embodiment of the present disclosure. In particular, in sequence 900B a video frame is encoded as an I-frame, and subsequent video frames are also encoded normally and after a delay of encoding the I-frame when the client bandwidth is moderate in relation to the target resolution of the client display. Because there is moderate bandwidth availability, a moderate amount of excess bandwidth is available to compensate for variability in latency between the cloud gaming server and the client (e.g., jitter), such that frame skipping can be avoided, and a return to low one-way latency can be achieved relatively quickly (e.g., within two to four frame period). Encode blocks and transmit blocks of video frames are shown in relation to a VSYNC signal 950.

The sequence 900B of video frames includes one encoded I-frame 905, with the remaining frames encoded as P-frames. For illustration, encode block 901 and encode block 902 as P-frames are encoded before encode block 905 is encoded as an I-frame. Afterwards, the encoder compresses the video frames as P-frames until the next scene change, or until a video frame cannot reference a previous key frame (e.g., I-frame). In general, the encode time for an I-frame block may take longer than a P-frame block, and the transmission of an I-frame may take longer than one frame period. For example, the encode time and transmission time for I-frame block 905 exceeds one frame period. Also, various transmit times are shown in relation to corresponding encoded video frames. For example, the encoding and transmission of video frames before I-frame block 905 are shown having low one-way latency, such that corresponding encode and transmit blocks may be performed within one frame period. However, the transmission block 915B for encoded I-frame block 905 is shown with higher one-way latency, such that the encode block 905 and the transmit block 915B occurs over two or more frame periods, thereby introducing jitter in the one-way latency between the cloud gaming server and the client. Encoding time may further be reduced by tuning one or more encoder parameters, as previously discussed (e.g., QP, target frame size, maximum frame size, encoder bit rate, etc.). That is, the second or subsequent video frame after an I-frame is encoded with less precision when the transmission rate to the client is moderate for the target resolution of the client display, and is encoded with less precision than when the transmission rate is high for the target resolution.

After I-frame block 905, the encoder continues to compress video frames, though they may momentarily be delayed because of the encoding of the I-frame. Again, synchronization and offset of VSYNC signals provides for overlapping operations (scan-out, encode, and transmit) at the cloud gaming server; overlapping operations (receive, decode, render, display) at the client; and/or overlapping operations at the cloud gaming server and the client—all of which promote compensation for variability in one-way latency introduced by server or network or client jitter, reductions in one-way latency, reductions in the variability in one-way latency, real-time generation and display of video content, and consistent video playback at the client.

Because the client bandwidth is moderate in relation to the target resolution of the client display, the transmission of encoded video frames returns back to one of low one-way latency around highlighted region 940, such as after two or three subsequent video frames have been encoded as P-frames and transmitted to the client. Within region 940, P-frames encoded after I-frame block 905 is encoded are also transmitted to the client within the same frame period, thereby returning to low one-way latency between the cloud gaming server and client.

Figure 9C:
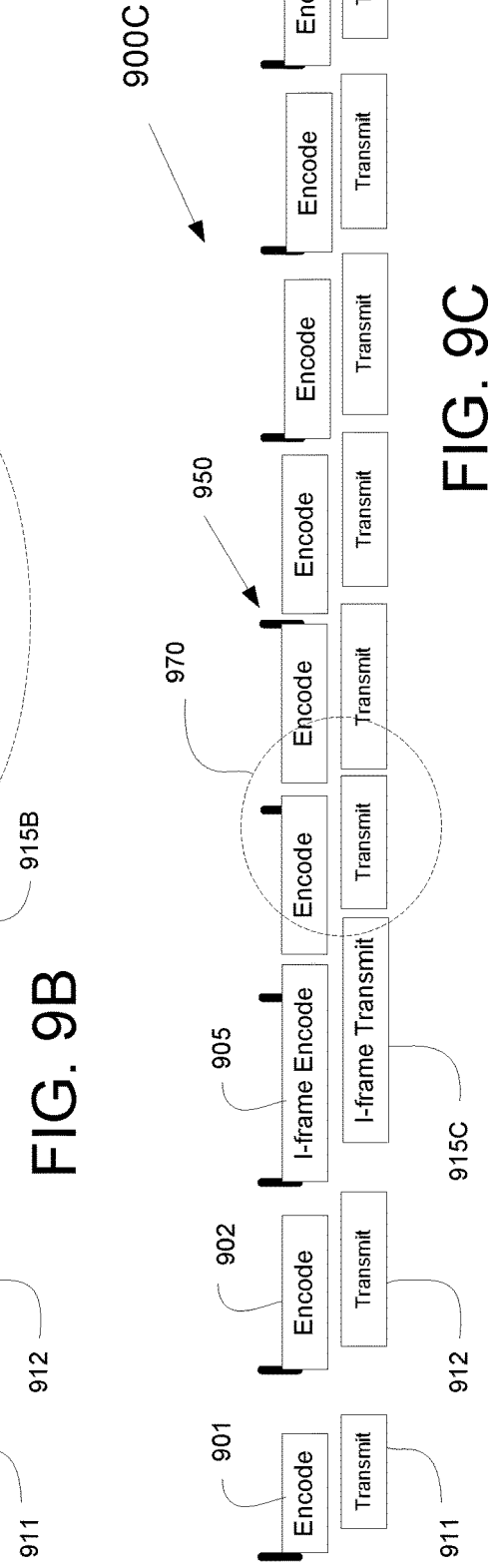

FIG. 9C illustrates a sequence 900C of video frames that is compressed by an encoder, wherein the encoder takes into consideration the available bandwidth to the client, such that if bandwidth exceeds that needed to support target resolution of a client display, it is possible to have none or fewer skipped frames, while still having lower one-way latency, in accordance with one embodiment of the present disclosure. In particular, in sequence 900C a video frame is encoded as an I-frame, and subsequent video frames are also encoded normally and after a delay of encoding the I-frame when the client bandwidth is high in relation to the target resolution of the client display. Because there is high bandwidth availability, a high amount of excess bandwidth is available to compensate for variability in one-way latency between the cloud gaming server and the client (e.g., jitter), such that frame skipping can be avoided, and a return to low one-way latency can be achieved immediately (e.g., within one to two frame periods). Encode blocks and transmit blocks of video frames are shown in relation to a VSYNC signal 950.

Similar to FIG. 9B, the sequence 900C of video frames in FIG. 9C includes one encoded I-frame 905, with the remaining frames encoded as P-frames. For illustration, encode block 901 and encode block 902 as P-frames are encoded before encode block 905 is encoded as an I-frame. Afterwards, the encoder compresses the video frames as P-frames until the next scene change, or until a video frame cannot reference a previous key frame (e.g., I-frame). In general, the encode time for an I-frame block may take longer than a P-frame block. For example, the encode time for I-frame block 905 may exceed one frame period. Also, various transmit times are shown in relation to corresponding encoded video frames. For example, the encoding and transmission of video frames before I-frame block 905 are shown having low latency, such that corresponding encode and transmit blocks may be performed within one frame period. However, the transmission block 915C for encoded I-frame block 905 is shown with higher latency, such that the encode block 905 and the transmit block 915C occurs over two or more frame periods, thereby introducing jitter in the one-way latency between the cloud gaming server and the client. Encoding time may further be reduced by tuning one or more encoder parameters, as previously discussed (e.g., QP, target frame size, maximum frame size, encoder bit rate, etc.).

After I-frame block 905, the encoder continues to compress video frames, though they may momentarily be delayed because of the encoding of the I-frame. Again, synchronization and offset of VSYNC signals provides for overlapping operations (scan-out, encode, and transmit) at the cloud gaming server; overlapping operations (receive, decode, render, display) at the client; and/or overlapping operations at the cloud gaming server and the client—all of which promote compensation for variability in latency introduced by server or network or client jitter, reductions in one-way latency, reductions in the variability in one-way latency, real-time generation and display of video content, and consistent video playback at the client. Because the client bandwidth is high in relation to the target resolution of the client display, the transmission of encoded video frames returns back to one of low one-way latency around highlighted region 970, such as after one or two subsequent video frames have been encoded as P-frames and transmitted to the client. Within region 970, P-frames encoded after I-frame block 905 is encoded are also transmitted to the client within one frame period (though they may straddle between two sides of an occurrence of a VSYNC signal), thereby returning to low one-way latency between the cloud gaming server and client.

Figure 10:
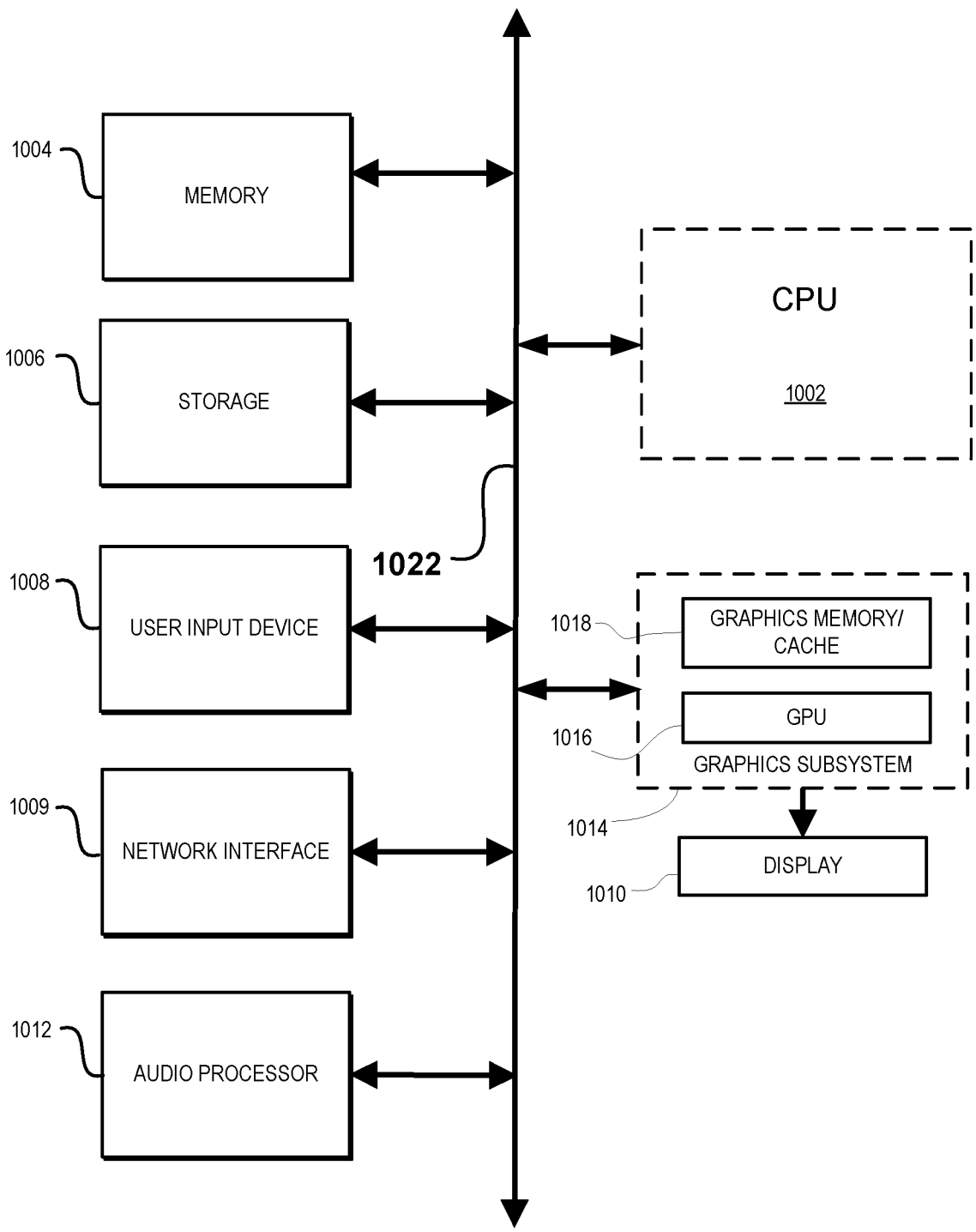
FIG. 10 illustrates components of an example device that can be used to perform aspects of the various embodiments of the present disclosure.

FIG. 10 illustrates components of an example device 1000 that can be used to perform aspects of the various embodiments of the present disclosure. For example, FIG. 10 illustrates an exemplary hardware system suitable for streaming media content and/or receiving streamed media content, including providing encoder tuning to improve tradeoffs between one-way latency and video quality in cloud gaming systems for purposes of reducing latency and providing more consistent latency between the cloud gaming server and a client, and for improving smoothness of client display of video, wherein encoder tuning may be based on monitoring of client bandwidth, skipped frames, number of encoded I-frames, number of scene changes, and/or number of video frames that exceed a target frame size, wherein tuned parameters may include encoder bit rate, target frame size, maximum frame size, and quantization parameter (QP) value, wherein high performance encoders and decoders help reduce the overall one-way latency between a cloud gaming server and client, in accordance with embodiments of the present disclosure. This block diagram illustrates a device 1000 that can incorporate or can be a personal computer, a server computer, gaming console, mobile device, or other digital device, each of which is suitable for practicing an embodiment of the invention. Device 1000 includes a central processing unit (CPU) 1002 for running software applications and optionally an operating system. CPU 1002 may be comprised of one or more homogeneous or heterogeneous processing cores.

In accordance with various embodiments, CPU 1002 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

Memory 1004 stores applications and data for use by the CPU 1002 and GPU 1016. Storage 1006 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1008 communicate user inputs from one or more users to device 1000, examples of which may include keyboards, mice, joysticks, touch pads, touch screens, still or video recorders/cameras, and/or microphones. Network interface 1009 allows device 1000 to communicate with other computer systems via an electronic communications network, and may include wired or wireless communication over local area networks and wide area networks such as the internet. An audio processor 1012 is adapted to generate analog or digital audio output from instructions and/or data provided by the CPU 1002, memory 1004, and/or storage 1006. The components of device 1000, including CPU 1002, graphics subsystem including GPU 1016, memory 1004, data storage 1006, user input devices 1008, network interface 1009, and audio processor 1012 are connected via one or more data buses 1022.

A graphics subsystem 1014 is further connected with data bus 1022 and the components of the device 1000. The graphics subsystem 1014 includes a graphics processing unit (GPU) 1016 and graphics memory 1018. Graphics memory 1018 includes a display memory (e.g., a frame buffer) used for storing pixel data for each pixel of an output image. Graphics memory 1018 can be integrated in the same device as GPU 1016, connected as a separate device with GPU 1016, and/or implemented within memory 1004. Pixel data can be provided to graphics memory 1018 directly from the CPU 1002. Alternatively, CPU 1002 provides the GPU 1016 with data and/or instructions defining the desired output images, from which the GPU 1016 generates the pixel data of one or more output images. The data and/or instructions defining the desired output images can be stored in memory 1004 and/or graphics memory 1018. In an embodiment, the GPU 1016 includes 3D rendering capabilities for generating pixel data for output images from instructions and data defining the geometry, lighting, shading, texturing, motion, and/or camera parameters for a scene. The GPU 1016 can further include one or more programmable execution units capable of executing shader programs.

The graphics subsystem 1014 periodically outputs pixel data for an image from graphics memory 1018 to be displayed on display device 1010, or to be projected by a projection system (not shown). Display device 1010 can be any device capable of displaying visual information in response to a signal from the device 1000, including CRT, LCD, plasma, and OLED displays. Device 1000 can provide the display device 1010 with an analog or digital signal, for example.

Other embodiments for optimizing the graphics subsystem 1014 could include multi-tenancy GPU operations where a GPU instance is shared between multiple applications, and distributed GPUs supporting a single game. The graphics subsystem 1014 could be configured as one or more processing devices.

For example, the graphics subsystem 1014 may be configured to perform multi-tenancy GPU functionality, wherein one graphics subsystem could be implementing graphics and/or rendering pipelines for multiple games, in one embodiment. That is, the graphics subsystem 1014 is shared between multiple games that are being executed.

In other embodiments, the graphics subsystem 1014 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, the present disclosure describes methods and systems configured for streaming media content and/or receiving streamed media content, including providing encoder tuning to improve tradeoffs between one-way latency and video quality in cloud gaming systems, wherein encoder tuning may be based on monitoring of client bandwidth, skipped frames, number of encoded I-frames, number of scene changes, and/or number of video frames that exceed a target frame size, wherein tuned parameters may include encoder bit rate, target frame size, maximum frame size, and quantization parameter (QP) value, wherein high performance encoders and decoders help reduce the overall one-way latency between a cloud gaming server and client.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for cloud gaming, comprising:
 generating a plurality of video frames when executing a video game at a cloud gaming server;
 measuring a maximum receive bandwidth of a client device;
 encoding the plurality of video frames;
 filling the plurality of video frames that is encoded to a buffer;
 dynamically tuning a buffer drain rate to be below the maximum receive bandwidth, wherein the plurality of video frames that is encoded is drained from the buffer at the buffer drain rate for transmission to the client device over a network.

2. The method of claim 1, wherein the dynamically tuning the buffer drain rate includes:
dynamically tuning the buffer drain rate to the maximum receive bandwidth.

3. The method of claim 1, further comprising:
dynamically tuning an encoder bit rate to the maximum receive bandwidth; and
performing the encoding of the plurality of video frames at the encoder bit rate.

4. The method of claim 1, further comprising:
filling the plurality of video frames that is encoded to the buffer as quickly as possible.

5. The method of claim 1,
wherein the maximum receive bandwidth is measured as a bit rate.

6. The method of claim 1, further comprising:
modifying at least one of the plurality of video frames to generate a modified video frame by compositing the at least one of the plurality of video frames with a user interface feature; and
draining the modified video frame from the buffer at the buffer drain rate.

7. The method of claim 1, wherein the measuring the maximum receive bandwidth includes:
draining a plurality of test packets from the buffer at a predefined bit rate that is a tested maximum receive bandwidth;
receiving feedback including a total number of the plurality of test packets received for a range of video frames;
determining a packet loss based on the total number of the plurality of test packets received and a number of the plurality of test packets; and
determining the maximum receive bandwidth based on the packet loss and the tested maximum receive bandwidth.

8. A non-transitory computer-readable medium storing a computer program for cloud gaming, the computer-readable medium comprising:
program instructions for generating a plurality of video frames when executing a video game at a cloud gaming server;
program instructions for measuring a maximum receive bandwidth of a client device;
program instructions for encoding the plurality of video frames;
program instructions for filling the plurality of video frames that is encoded to a buffer;
program instructions for dynamically tuning a buffer drain rate to be below the maximum receive bandwidth, wherein the plurality of video frames that is encoded is drained from the buffer at the buffer drain rate for transmission to the client device over a network.

9. The non-transitory computer-readable medium of claim 8, wherein the program instructions for dynamically tuning the buffer drain rate includes:
program instructions for dynamically tuning the buffer drain rate to the maximum receive bandwidth.

10. The non-transitory computer-readable medium of claim 8, further comprising:
program instructions for dynamically tuning an encoder bit rate to the maximum receive bandwidth; and
program instructions for performing the encoding of the plurality of video frames at the encoder bit rate.

11. The non-transitory computer-readable medium of claim 8, further comprising:
program instructions for filling the plurality of video frames that is encoded to the buffer as quickly as possible.

12. The method of claim 1,
wherein in the method the maximum receive bandwidth is measured as a bit rate.

13. The non-transitory computer-readable medium of claim 8, further comprising:
program instructions for modifying at least one of the plurality of video frames to generate a modified video frame by compositing the at least one of the plurality of video frames with a user interface feature; and
program instructions for draining the modified video frame from the buffer at the buffer drain rate.

14. The non-transitory computer-readable medium of claim 8, wherein the program instructions for measuring the maximum receive bandwidth includes:
program instructions for draining a plurality of test packets from the buffer at a predefined bit rate that is a tested maximum receive bandwidth;
program instructions for receiving feedback including a total number of the plurality of test packets received for a range of video frames;
program instructions for determining a packet loss based on the total number of the plurality of test packets received and a number of the plurality of test packets; and
program instructions for determining the maximum receive bandwidth based on the packet loss and the tested maximum receive bandwidth.

15. A computer system comprising:
a processor; and
memory coupled to the processor and having stored therein instructions that, if executed by the computer system, cause the computer system to execute a method for cloud gaming comprising:
generating a plurality of video frames when executing a video game at a cloud gaming server;
measuring a maximum receive bandwidth of a client device;
encoding the plurality of video frames;
filling the plurality of video frames that is encoded to a buffer;
dynamically tuning a buffer drain rate to be below the maximum receive bandwidth, wherein the plurality of video frames that is encoded is drained from the buffer at the buffer drain rate for transmission to the client device over a network.

16. The computer system of claim 15, wherein in the method the dynamically tuning the buffer drain rate includes:
dynamically tuning the buffer drain rate to the maximum receive bandwidth.

17. The computer system of claim 15, the method further comprising:
dynamically tuning an encoder bit rate to the maximum receive bandwidth; and
performing the encoding of the plurality of video frames at the encoder bit rate.

18. The computer system of claim 15, the method further comprising:
filling the plurality of video frames that is encoded to the buffer as quickly as possible.

19. The computer system of claim 15, wherein in the method the maximum receive bandwidth is measured as a bit rate.

20. The computer system of claim 15, the method further comprising:
modifying at least one of the plurality of video frames to generate a modified video frame by compositing the at least one of the plurality of video frames with a user interface feature; and
draining the modified video frame from the buffer at the buffer drain rate.

* * * * *